(12) United States Patent
Katase

(10) Patent No.: US 6,961,047 B2
(45) Date of Patent: Nov. 1, 2005

(54) METHOD AND CIRCUIT FOR DRIVING ELECTROPHORETIC DISPLAY, ELECTROPHORETIC DISPLAY AND ELECTRONIC DEVICE USING SAME

(75) Inventor: Makoto Katase, Hotaka-cho (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/849,878

(22) Filed: May 21, 2004

(65) Prior Publication Data

US 2004/0212870 A1 Oct. 28, 2004

Related U.S. Application Data

(62) Division of application No. 09/884,092, filed on Jun. 20, 2001, now Pat. No. 6,762,744.

(30) Foreign Application Priority Data

| Jun. 22, 2000 | (JP) | ................................ | 2000-187922 |
| Aug. 3, 2000 | (JP) | ................................ | 2000-236197 |
| Jun. 20, 2001 | (JP) | ................................ | 2001-187279 |

(51) Int. Cl.$^7$ ............................................. G09G 3/34
(52) U.S. Cl. ....................... 345/107; 345/690; 359/296
(58) Field of Search ................................ 345/107, 690, 345/204, 211, 87; 359/296; 310/328

(56) References Cited

U.S. PATENT DOCUMENTS

| 3,668,106 | A | 6/1972 | Ota |
| 5,627,561 | A | 5/1997 | Laspina et al. |
| 6,373,461 | B1 | 4/2002 | Hasegawa et al. |
| 6,650,462 | B2 | 11/2003 | Katase |
| 2002/0036616 | A1 | 3/2002 | Inoue |

FOREIGN PATENT DOCUMENTS

| EP | 1 024 540 A2 | 8/2000 |
| JP | 49-32038 | 8/1974 |
| JP | 50-15115 | 6/1975 |
| JP | A-51-041994 | 4/1976 |
| JP | A-51-041995 | 4/1976 |
| JP | A-51-046896 | 4/1976 |
| JP | A-51-046897 | 4/1976 |
| JP | A-51-112360 | 10/1976 |
| JP | 52-027295 | 3/1977 |
| JP | U-62-038626 | 3/1987 |
| JP | A 5-173194 | 7/1993 |
| JP | A 6-510370 | 11/1994 |
| JP | A 9-6277 | 1/1997 |
| JP | A 9-16116 | 1/1997 |
| JP | A 9-185087 | 7/1997 |
| JP | A 10-69241 | 3/1998 |
| JP | A 2000-35775 | 2/2000 |
| JP | A 2000-221546 | 8/2000 |
| WO | WO 93/06585 | 4/1993 |

OTHER PUBLICATIONS

Kawai et al., "Microcapsule–type Electrophoretic Display (MC–EPD)", Japan Hardcopy, pp. 237–240, 1999.
Kawai, "Microcapsule–type Electrophoretic Display (MC–EPD)", Journal of the Imaging Society of Japan, vol. 38, No. 2, pp. 51–56, 1999.

*Primary Examiner*—Xiao Wu
(74) *Attorney, Agent, or Firm*—Oliff & Berridge, PLC

(57) ABSTRACT

A method for driving an active matrix electrophoretic display is provided. In a resetting period Tr, reset data Drest is supplied to a data line drive circuit and a reset voltage is applied to each pixel electrode. Next in a writing period, an image data is supplied to a data line drive circuit and a gradation voltage is applied to each pixel electrode. Subsequently a common voltage is applied to it, in order to take charge which is accumulated between the electrodes away, applying no electric field to a dispersal system. Then a displayed image is held.

17 Claims, 33 Drawing Sheets

US 6,961,047 B2

METHOD AND CIRCUIT FOR DRIVING ELECTROPHORETIC DISPLAY, ELECTROPHORETIC DISPLAY AND ELECTRONIC DEVICE USING SAME

This is a Division of application Ser. No. 09/884,092 filed Jun. 20, 2001 now U.S. Pat. No. 6,762,744. The entire disclosure of the prior application is hereby incorporated by reference herein in its entirety.

BACKGROUND OF THE INVENTION

1. Technical Field of the Invention

The present invention relates to an electrophoretic display, a method and apparatus for driving it, and an electronic device using it.

2. Description of Related Art

In the conventional art, electrophoretic displays are known which consist of a pair of panels or substrates spaced apart in opposing relation, each of which is provided with an electrode. Between these electrodes a dyed dielectric fluid is provided. Suspended in the fluid are electrically charged particles having a pigment color different to the fluid in which they are suspended (hereinafter referred to simply as pigment particles). In a display update operation, differing voltages are applied via a switching element to the electrodes to generate an electrostatic field in the dielectric fluid, causing the pigment particles to migrate in the direction of the applied field.

Electrophoretic displays utilizing an electrophoresis phenomenon are classed as non-luminous devices. In electrophoresis, pigment particles migrate under the action of Coulomb force which is generated when an electrostatic field is applied to a dielectric fluid in which the particles are dispersed.

However, prior art electrophoretic displays suffer from a problem in that they afford poor viewing characteristics. The present invention has been made to overcome this problem, and provides for the first time an active matrix electrophoretic display, which display has superior viewing characteristics.

SUMMARY OF THE INVENTION

As stated above, the object of the present invention is to provide an active matrix electrophoretic display. Also provided is a drive circuit integral to the device, and a method for driving the display by using the circuit. In addition there is provided is an electronic device attached to the electrophoretic display.

A method provided by the present invention is applied to an electrophoretic display comprising a common electrode, a plurality of pixels and a plurality of switching elements, each of which is assigned to a corresponding one of a plurality of switching elements. Each of the pixels is comprised of a pixel electrode which is connected to a corresponding switching element, with the pixel electrode being provided in spaced opposing relation to the common electrode, and a dispersal system comprising a colored fluid in which pigment particles are suspended being provided between the common electrode and the pixel electrode.

In the method of the present invention, a 1st voltage is applied to the common electrode. A 2nd voltage is then applied for a set period of time via a corresponding switching element to a pixel electrode, to generate an electrostatic field in the dispersal system of the pixel, to cause the pigment particles to migrate in the direction of the thus generated field to a desired position, which corresponds to a desired color gradation of the pixel. Next, the 1st voltage is applied via a corresponding switching element to the pixel electrode, to cancel the electrostatic filed and fix said pigment particles in a desired position.

In the present invention, in addition to these steps, which are common to the prior art, a new method is employed whereby differential voltages are applied which are calculated on the basis of a difference between a current average position of pigment particles and a subsequent desired position. By continually updating the voltage gradient using these parameters, positions of pigment particles can be updated without the need for an initialization step. Since no initialization step is required, display updates can be affected rapidly.

In the present invention, to further improve display image characteristics, it is preferable for there to be variations in the properties of pigment particles employed, such as charge and mass. As noted above, in the present invention pigment particles do not need to be initialized before a display update is made. This helps to overcome a problem which conventional electrophoretic displays suffer from, whereby after a voltage differential between electrodes is cancelled, pigment particles continue to move under their inertia. This residual movement of pigment particles causes fluctuations in an image displayed. In the case that minimal fluid resistance acts against pigment particles, inertial movement of the particles and resulting display fluctuations become pronounced. To overcome this problem of inertial particle movement, in the method of the present invention, after a differential voltage is applied to a second electrode, a further 'brake' voltage is applied to the dielectric fluid to stop movement of the pigment particles rapidly. Since a direction of motion of a particle is determined by a direction and polarity of an applied electrostatic field, a brake voltage to be applied has a polarity which is opposite to that of a voltage applied to a pixel electrode. Different from prior art displays, in the electrophoretic display of the present invention a plurality of discrete dispersal systems are employed in electrical communication with a common electrode. The dispersal systems comprise a colored dielectric fluid in which contrasting pigment particles are suspended; a plurality of data lines; a plurality of scanning lines; and a plurality of switching elements, which are provided at intersections between scanning and data lines. In addition, a plurality of pixel electrodes is also provided, and each of these pixel electrodes is connected to a corresponding switching element, and is also subject to a charge applied by the common electrode. In the method of driving the display of the present invention, a voltage is applied to the common electrode, and scanning lines are then subjected to sequential selection. In a next step, a voltage corresponding to a required screen update is applied by the pixel electrodes to the data lines, and a differential voltage is applied to the pixel electrodes via their respective switching elements, causing pigment particles suspended in the dielectric fluid of respective display systems to migrate in the direction of the applied field. To fix a position of the particles, a uniform voltage is then applied to respective pixel electrodes via their switching elements, and the switching elements are then turned off.

It is to be noted that in the present invention, voltages are applied as required, via switching elements, to respective pixel electrodes, thereby creating a matrix in the electrophoretic display. In the method for driving the electrophoretic display of the present invention, each of the pixel electrodes is first subject to a preset uniform voltage applied by the common electrode. Scanning lines are then selected sequentially. Next, a voltage differential corresponding to a desired display update is applied via the switching elements to their respective pixel electrodes, whereby designated pigment particles are caused to migrate. To maintain a desired display state, a uniform voltage is applied to each of the pixel electrodes via respective switching elements, and, further, a break voltage is applied to counter inertial movement of the suspended pigment particles in each of the particle dispersion systems, and finally the switching elements are turned off.

According to the present invention, an active matrix electrophoretic display can be realized by applying differential voltages via a plurality of switching elements to a plurality of corresponding pixel electrodes.

DETAILED DESCRIPTION OF THE PREFERRED EMBODIMENTS

Referring to the accompanying drawings, preferred embodiments of the present invention will now be described.

(A) First Embodiment

An electrophoretic display of the present embodiment displays an image according to an input image signal (VID). It is able to display both static and animated images, but is particularly suited to displaying static images.

(A-1) Outline of an Electrophoretic Display

Figure 1:
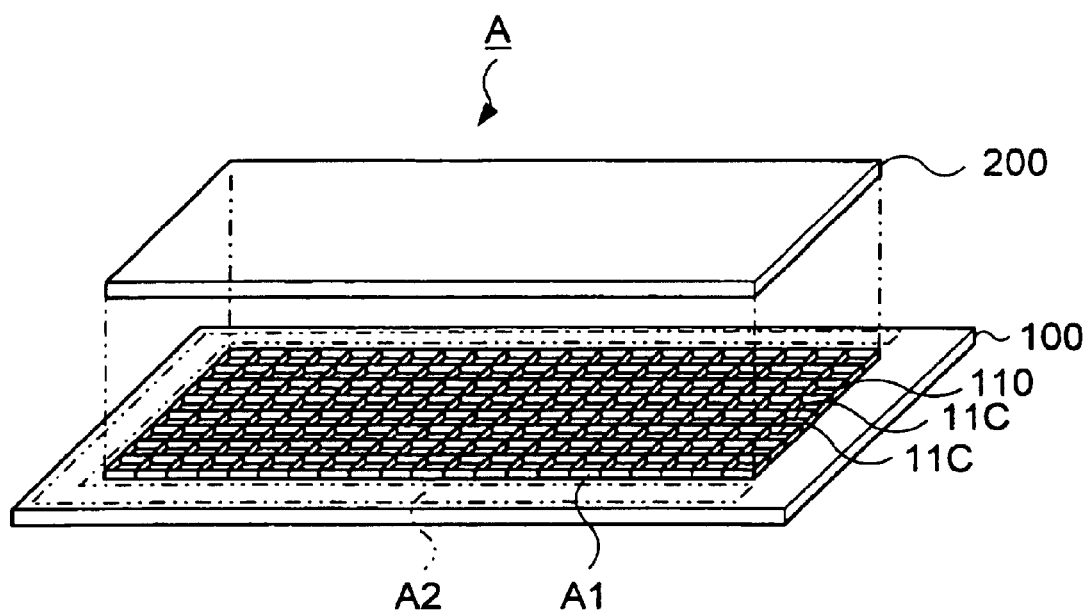
FIG. 1 is an exploded perspective view showing a mechanical configuration of an electrophoretic display panel based on the first embodiment of the present invention.

FIG. 1 is an exploded perspective view showing the mechanical configuration of an electrophoretic display panel A, according to the first embodiment of the present invention.

Figure 2:
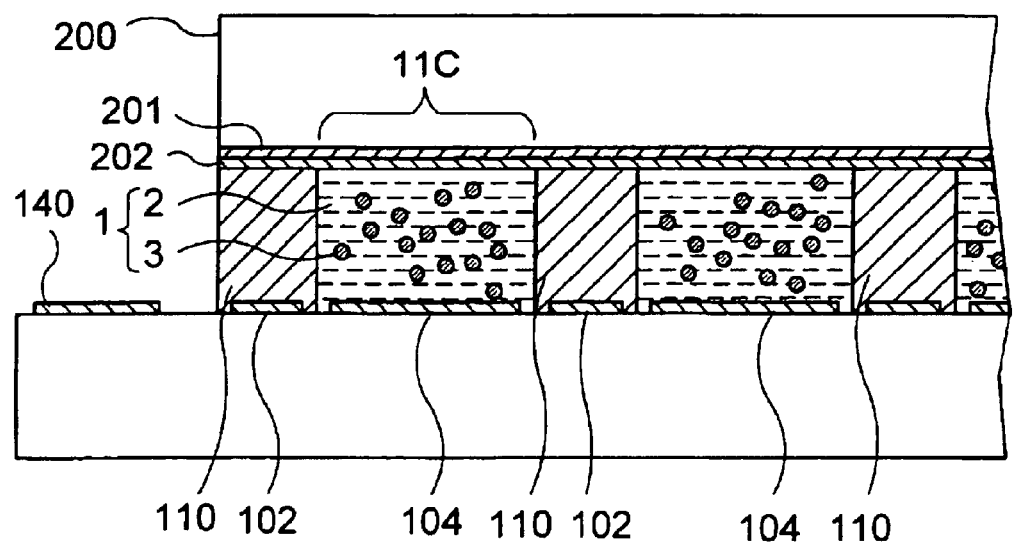
FIG. 2 is a partial sectional view of the panel.

FIG. 2 is a partial sectional view of the panel.

As shown in FIGS. 1 and 2, an electrophoretic display panel A has an element substrate 100 and an opposing substrate 200. Element substrate 100 is made of glass, a semiconductor or some other suitable material. Opposing substrate 200 is made of glass or some other suitable transparent material. A common electrode 201 is formed on opposing substrate 200. A plurality of pixel electrodes 104 are formed on element substrate 100 to constitute a plurality of pixels, each of which corresponds to one unit of an image. Substrates 100 and 200 are provided in opposing relation to each other such that electrodes formed on the surfaces of the substrates face each other at regular intervals. Between these electrode surfaces, bulkheads 110 are provided which divide the electrode surfaces into a plurality of spaces, with each spaces facing, respectively, pixel electrodes 104. These spaces are referred to hereinafter as divided cells 11C. Each divided cell 11C is provided with a dispersal system 1 comprising a dielectric fluid 2 in which pigment particles are suspended. If required, the dielectric fluid 2 can be provided with an additive such as a surface-active agent. In dispersal system 1, to avoid sedimentation of pigment particles 3 under gravity, both the dielectric fluid 2 and pigment particles 3 are selected to be approximately equal in specific gravity to each other.

In this embodiment, an electrostatic field is applied to dispersal system 1 in each divided cell 11 to move the pigment particles in the system to a desired position which corresponds to a desired color gradation of the pixel. It is possible to provide a large number of divided cells 11C in the bulkhead 110, and the range in which pigment particles 3 are able to migrate is thereby limited to the inner space of each divided cell 11C. In the dispersal system 1, migration of particles may be uneven or the particles may condense to form a lump. However, using a plurality of divided cells 11C in the bulkhead 110 prevents such a phenomenon from occurring, and as a result the quality of images displayed is improved. In electrophoretic display panel A, each pixel is capable of displaying one of the three primary colors (RGB). This is achieved by effecting three different types of dispersion in the dispersal system corresponding to R, G and B colors, respectively. Thus, when it is required to express dispersal system 1, dielectric fluid 2, and pigment particles 3 as a separate primary color each, subscripts "r," "g," and "b" are appended respectively to each element.

Thus, in this embodiment, dispersal system 1r corresponding to R color has red particles as the pigment particles 3r and the dielectric fluid 2r is a cyanogen color medium. The pigment particles 3r are made of iron oxide, for example. The dispersal system 1g corresponding to G color uses green particles as the pigment particles 3g and the dielectric fluid 2g is a magenta-color medium. The pigment particles 3g are made of cobalt-green pigment particles, for example. The dispersal system 1b corresponding to B color uses blue particles as the pigment particles 3b and the dielectric fluid 2b is a yellow medium. The pigment particles 3b are made of cobalt-blue pigment particles, for example.

That is, the pigment particles 3 that correspond to each color to be displayed are used, while the dielectric fluid 2 of a certain color (the complementary color, in this embodiment) that absorbs the color to be displayed is used.

The opposing substrate 200, the common electrode 201, and the sealer 202 are transparent, enabling a user to see images displayed the opposing substrate 200. Thus, if pigment particles 3 migrate towards to the display-surface-side electrode, they will reflect light of a wavelength corresponding to the color to be displayed. On the other hand, when the pigment particles 3 migrate to the opposite-side electrode to the display surface, light of a wavelength corresponding to the color to be displayed is absorbed by the dielectric fluid 2. In this case, such light will not be visible to a user, and therefore no color will be visible. In the present invention, a strength of an electrostatic field applied to the dispersal system 1 determines how the pigment particles 3 are distributed in the direction of thickness of the dispersal system 3. The combined use of the pigment particles 3, the dielectric fluid 2 which absorbs light reflected by pigment particles 3, and controlling the dielectric field strength enables adjustment of light reflectance of a color. As a result, a strength of light reaching an observer can be controlled.

A display area A1 and a peripheral area A2 partitioned by bulkheads 110 are provided on the surfaces of the element substrate 100 which faces the opposing substrate 200. In the display area, in addition to the pixel electrodes 104, thin film transistors (hereinafter, referred to as TFTs) are employed as scanning and data lines, and switching elements are also employed and will be described later. In the peripheral area A2 of the surface of the element substrate 100, a scanning line drive circuit, a data line drive circuit, and externally connected electrodes which will be described later are formed.

Figure 3:
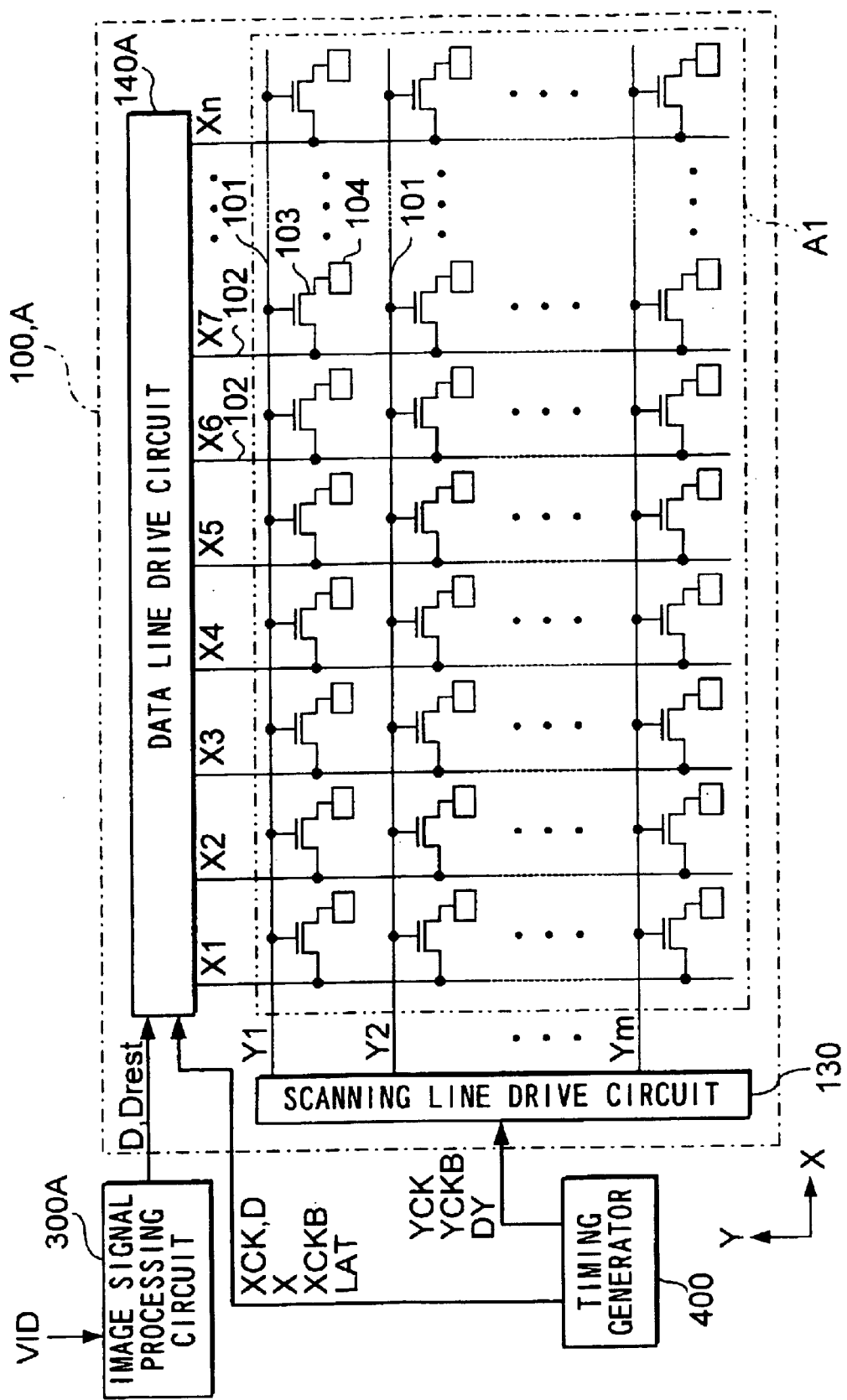
FIG. 3 shows a block diagram of an electrical configuration of an electrophoretic display having the panel.

FIG. 3 is a block diagram showing the electrical configuration of the electrophoretic display. As shown, the electrophoretic display is provided with the electrophoretic display panel A; a peripheral circuit including an image processing circuit 300A; and a timing generator 400. The image processing circuit 300A generates image data D by compensating input image signal VID based on the electrical characteristics of the electrophoretic display panel A and outputs reset data Drest for a predetermined period before it outputs the image data D.

The reset data Drest is used for attracting pigment particles 3 to the pixel electrodes 104 so that their positions are initialized. In this embodiment, dielectric fluid 2 is dyed black and pigment particles 3 consist of titanium oxide, which has a whitish color, and for in this explanation will be described as having a positive charge. Timing generator 400 generates several timing signals synchronously with image D, described later for a scanning drive circuit 130 and data line drive circuit 140A.

In display area A1 of electrophoretic display panel A, a plurality of scanning lines 101 are formed in parallel to an X-direction, while a plurality of data lines 102 are formed in parallel to a Y-direction which is orthogonal to the X-direction. A TFT 103 and a pixel electrode 104 are positioned to provide a pixel in the vicinity of each of the intersections made by these scanning lines 101 and data lines 102. Hence the pixels are mapped in a matrix by the intersections made between scanning lines 101 and data lines 102. The gate electrode of TFT 103 of each pixel is connected to a particular scanning line 101 for the pixel and a source electrode thereof is connected to a particular data line 102 for the pixel. Moreover, a drain electrode of the TFT is connected to pixel electrode 104 of the pixel. Each pixel is composed of a pixel electrode 104, a common electrode 201 formed on opposing substrate 102, and dispersal system 1 provided between the substrates on which the common and pixel electrodes are provided, respectively.

Scanning line drive circuit 130 and data line drive circuit 140, consisting of TFTs, are made using the same production process as pixel TFTs 103. This is advantageous in terms of integration of elements and production costs.

When a scanning signal Yj is brought to its active state, TFTs 103 on the jth scanning line 101, to which signal Yj is supplied, data line signals X1, X2, ..., Xn are provided sequentially to pixel electrodes 104. On the other hand, the common voltage Vcom is applied from a power supply, not shown, to the common electrode on opposing substrate 200. This generates a dielectric field between each pixel electrode 104 and common electrode 201 on opposing substrate 200. As a result, the pigment particles 3 within dispersal system 1 migrate to and an image is displayed using gradations based on image data D on a pixel-by-pixel basis.

(A-2) Principle of Displaying

FIG. 4 is a cross-sectional view of a simplified structure of divided cell 11C. In this embodiment, firstly the reset operation is carried out.

Figure 4A:
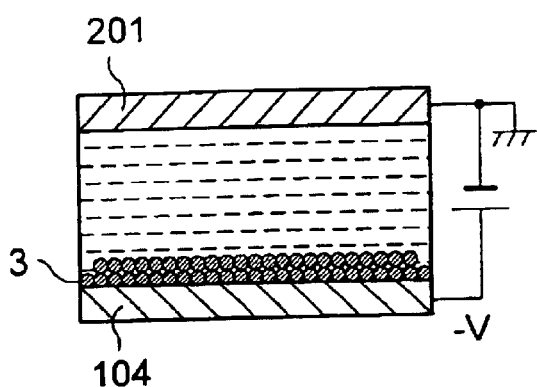
FIG. 4 is a simplified partial sectional view of the divided cell of the panel.
Figure 4B:
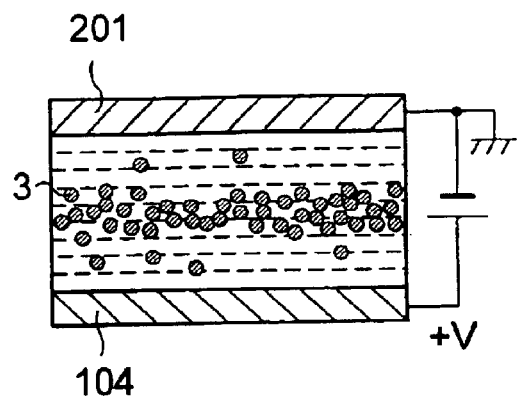

Supposing that pigment particles 3 are positively charged, an operation is conducted to apply a voltage to pixel electrode 104, which has negative polarity relative to that of common electrode 201, and pigment particles 3 are attracted to pixel electrode 104 as shown in FIG. 4A. Next, a positive-polarity voltage is applied to pixel electrode 104, the voltage corresponding to a gradation to be displayed as shown in FIG. 4B. And the pigment particles migrate towards common electrode 201 following the dielectric field. When the potential difference is made zero, no dielectric field is applied to the particles, and they stop moving as a result of fluid resistance. In this case, since the velocity of the particle is determined by a strength of an applied dielectric field, that is, the migration time of a particle is determined by an applied voltage, if the duration is constant, changing the applied voltage will lead to a change in average position of pigment particles 3 in the direction of thickness.

Incident light from common electrode 201 is reflected by pigment particles 3 and this reflected light reaches observer's eye through common electrode 201. Incident and reflected light are absorbed in dielectric fluid 2 and the absorption rate is proportional to the optical path length. Hence a gradation recognized by an observer is determined by the positions of pigment particles 3. As mentioned above, since the positions of pigment particles 3 are determined by an applied voltage over a constant period, a desired gradation will be displayed.

Dispersal system 1 comprises a large number of pigment particles. If they all have the same properties, such as electrical property (for instance, charge), mechanical properties (for instance size, mass,) and other properties, they will behave in the same manner.

However the thickness of a divided cell 11C is made to be from a few up to a maximum of 10 micrometers, and thus a maximum migration length of pigment particle 3 is very short. Consequently, to improve image display characteristics, an infinitesimal migration length must be controlled. To achieve this, low voltages to effect a gradation must be used, which makes gradation control difficult.

Figure 5:
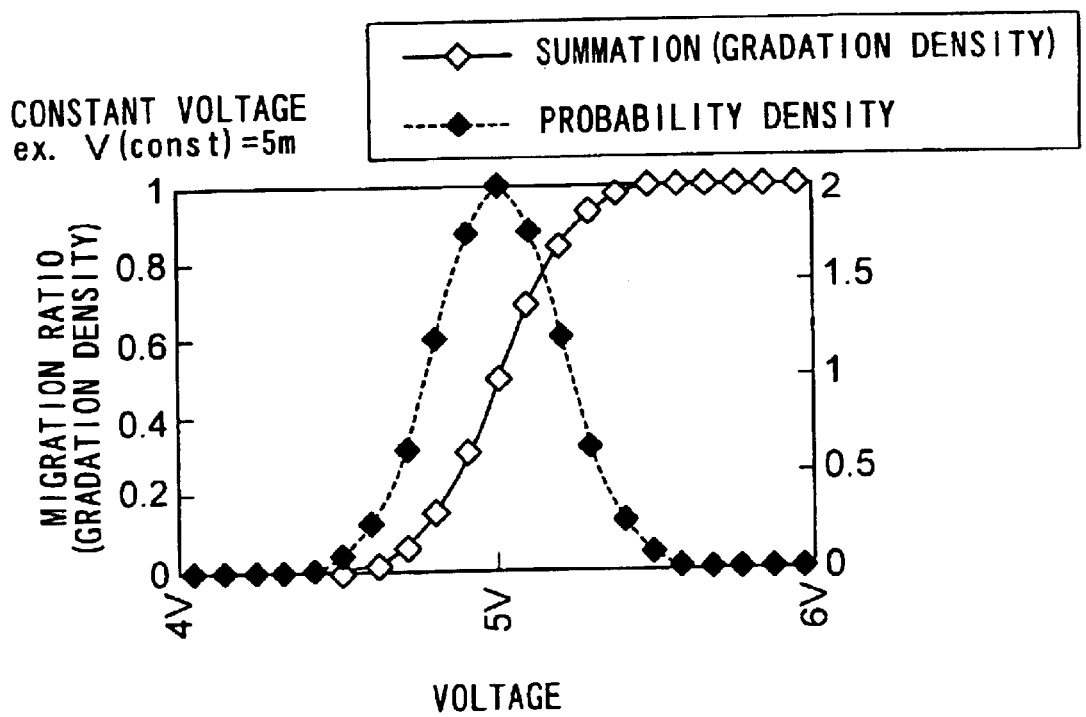
FIG. 5 exemplifies the relation of the voltage between the two electrodes and the divided cell.

To assist in control, pigment particles are provided with differing properties. These differences enable a statistical distribution to be achieved of positions of pigment particles. FIG. 5 shows an example of a relation between a voltage applied between a common and pixel electrodes and the gradation displayed. The time fame for voltage application is 50 milliseconds and the average voltage applied to migrate pigment particles 3 to common electrode 201 is 5 volts; and the standard deviation of the distribution is 0.2 volts normalized with 5 volts.

In this figure, a solid line shows the characteristics of gradation according to the applied voltage and dotted line shows the probability density function. Probability density is the number of particles that have reached the common electrode 201 which is normalized with 5 volts.

As shown therein, when the applied voltage is lower than 4.5 volts pigment particles merely reach the common electrode 201, but when the applied voltage is 5 volts, half the particles 3 reaches to it, and the voltage is higher than 5.5 volts almost all of them reaches. Therefore an applied voltage should be controlled in the range from 4.5 to 5.5 volts to obtain the desired color gradation image.

(A-3) Drive Circuit

Figure 7:
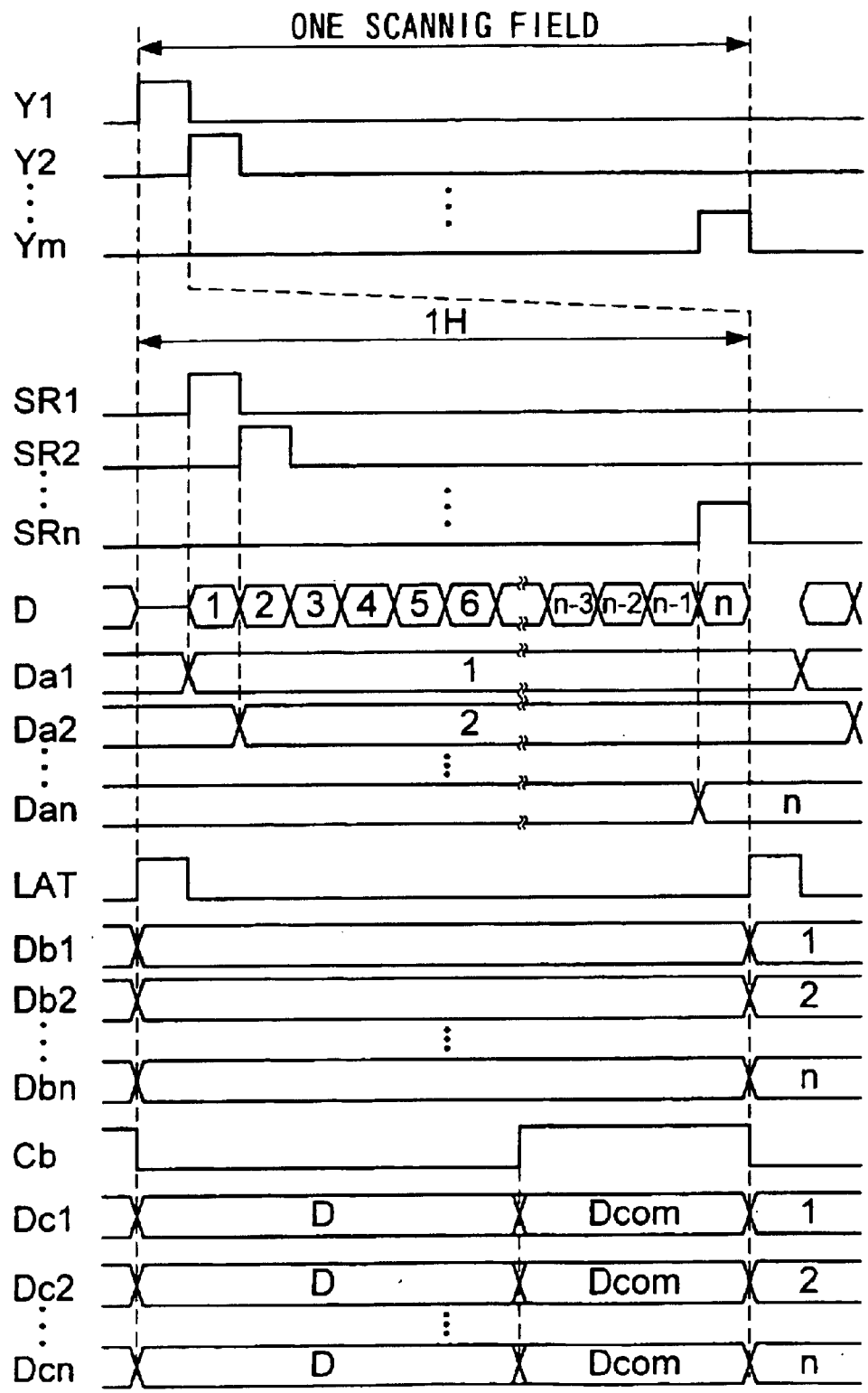
FIG. 7 is a timing chart of the scanning drive circuit 130A and the data line drive circuit 140A.

As shown in FIG. 3, the scanning drive circuit 130 has a shift resister and sequentially shifts a Y-transfer start pulse DY which becomes become active at the beginning of vertical scanning lines based upon a Y-clock signal YCK and its inverted Y-clock YCKB and generates scanning line signals Y1, Y2, . . . , Ym. As shown in FIG. 7, scanning signals which sequentially shift their activating period (the the H-level period) are generated and outputted to each scanning line 101.

Figure 6:
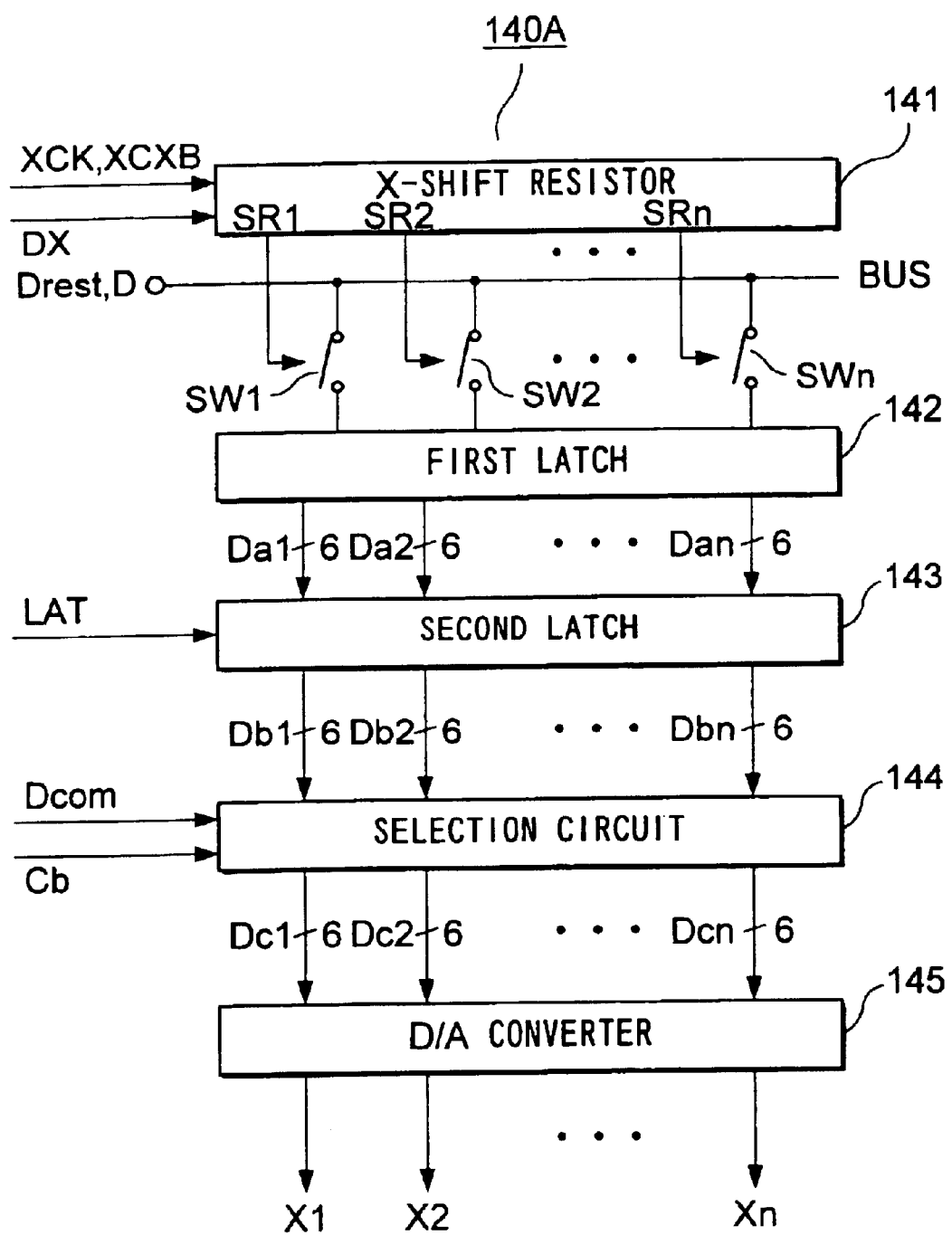
FIG. 6 is block diagram of the data line drive circuit 140A of the electrophoretic display.

FIG. 6 shows a block diagram of the scanning line drive circuit 140A. Data line driving circuit 140A has an X-shift resister 141, a bus BUS which is supplied image data composed of 6 bits, switches SW1, . . . , SWn, a first latch 142, a second latch 143, a selection circuit 144 and a D/A converter 145.

Firstly, the X-shift resister 141 sequentially shifts a X-transfer start pulse DX to generate sampling pulse SR1, SR2, . . . , SRn sequentially according to the X-clock XCK and its inverted X-clock XCKB.

Secondly, the bus BUS is connected to the first latch 142 through the switch SW1, . . . , SWn and sampling pulses SR1, SR2, . . . , SRn are supplied to each input terminal with the corresponding switch. A switch SWj is a set of 6 switches according to the 6 bits image data. Hence the image data D is, at a time, imported to the first latch 142 synchronously with with each sampling pulse SR1, SR2, . . . , SRn.

The first latch 142 latches image data D supplied from switch SW1, . . . , SWn and outputs it as dot-sequential data Da1, . . . , Dan. The second latch 143 latches each dot-sequential data Da1, . . . , Dan with a latch pulse LAT, which becomes active in every horizontal scanning time. The second latch 143 generates line-sequential data Db1, . . . , Dbn from dot-sequential data Da1, . . . , Dan.

The common voltage data Dcom generated in the image processing circuit 300A and a no-bias timing signal Cb generated in the timing generator 400 is supplied to the selection circuit 144.

The data Dcom is data which sets the voltage which is supplied to the common electrode 201 (ground level, for instance). The no-bias timing signal Cb becomes active (the H-level) from a certain point to the end in a horizontal scanning time.

The selection circuit 144, when non-bias timing signal is active, selects the common voltage data Dcom, while when it is inactive, selects line-sequential data Db1, . . . , Dbn to output data Dc1, . . . , Dcn as shown in FIG. 7. The D/A converter 145 converts data Dc1, . . . , Dcn, 6 bits digital data into analog signal and generates this as each data line signal X1, . . . , Xn and supplies it to each data line 102.

(A-4) Operation in an Electrophoretic Display

Figure 8:
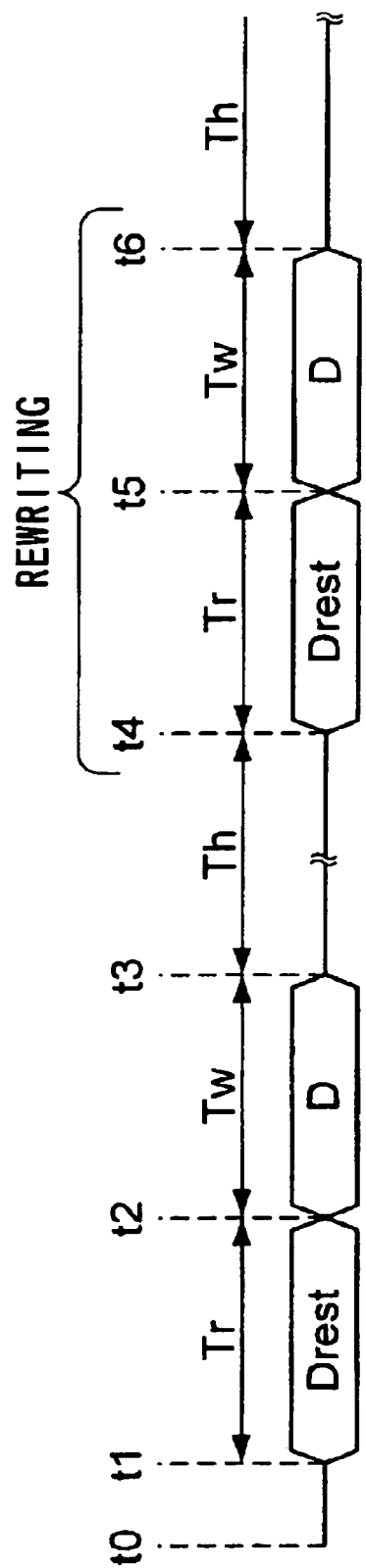
FIG. 8 is a timing chart showing the outputted data from the image processing circuit 300A.

FIG. 8 shows a timing chart of an output data from the image signal processing circuit 300A. Outline of the operation will be described referring to FIG. 8.

Firstly, at time t0, the image signal processing circuit 300A, timing generator 400 and electrophoretic display panel A is turned the power on when the power supply of the electrophoretic device is switched on.

After the circuit is stabilized, the image signal processing circuit 300A outputs the reset data Drest over a period of one scanning field. In the example shown in FIG. 8, the scanning field starts at time t1. At reset time Tr, pigment praticles 3 are attracted to the pixel electrodes 104 and their positions are initialized as described above.

While a data line drive circuit 104A outputs the reset voltages Vrest to each data line 102 according to data values of Drest, the scanning line drive circuit 130 sequentially selects each the line 101, with the result that the reset voltage Vrest is applied to all the pixel electrodes 104.

Next, a writing period Tw begins at a time t2. In this writing period Tw, the image signal processing circuit 300A outputs image data D over one scanning field.

The gradation voltages V are applied to each pixel electrode 104 corresponding to the gradation to be displayed so that a section of display image is completed.

After next, in a holding period Th which starts with time t3 and ends with time t4, the image is held which is written in the immediately preceding writing period Tw. Its length can be set freely. In this period, the image signal processing circuit 300A halts and outputs no data and no electrostatic field is generated between the pixel electrodes 104 and the common electrode 201. The pigment particles 3 do not change position unless they are subject to an electrostatic field, and consequently, a static image is displayed over the period.

Next, in the period which begins with time t4 and ends with t6, the image is rewritten. In a similar way in the period that is from time t1 to time t3, the writing operation subsequent to the reset operation is carried out so that the displayed image is renewed.

(1) Resetting Operation

Figure 9:
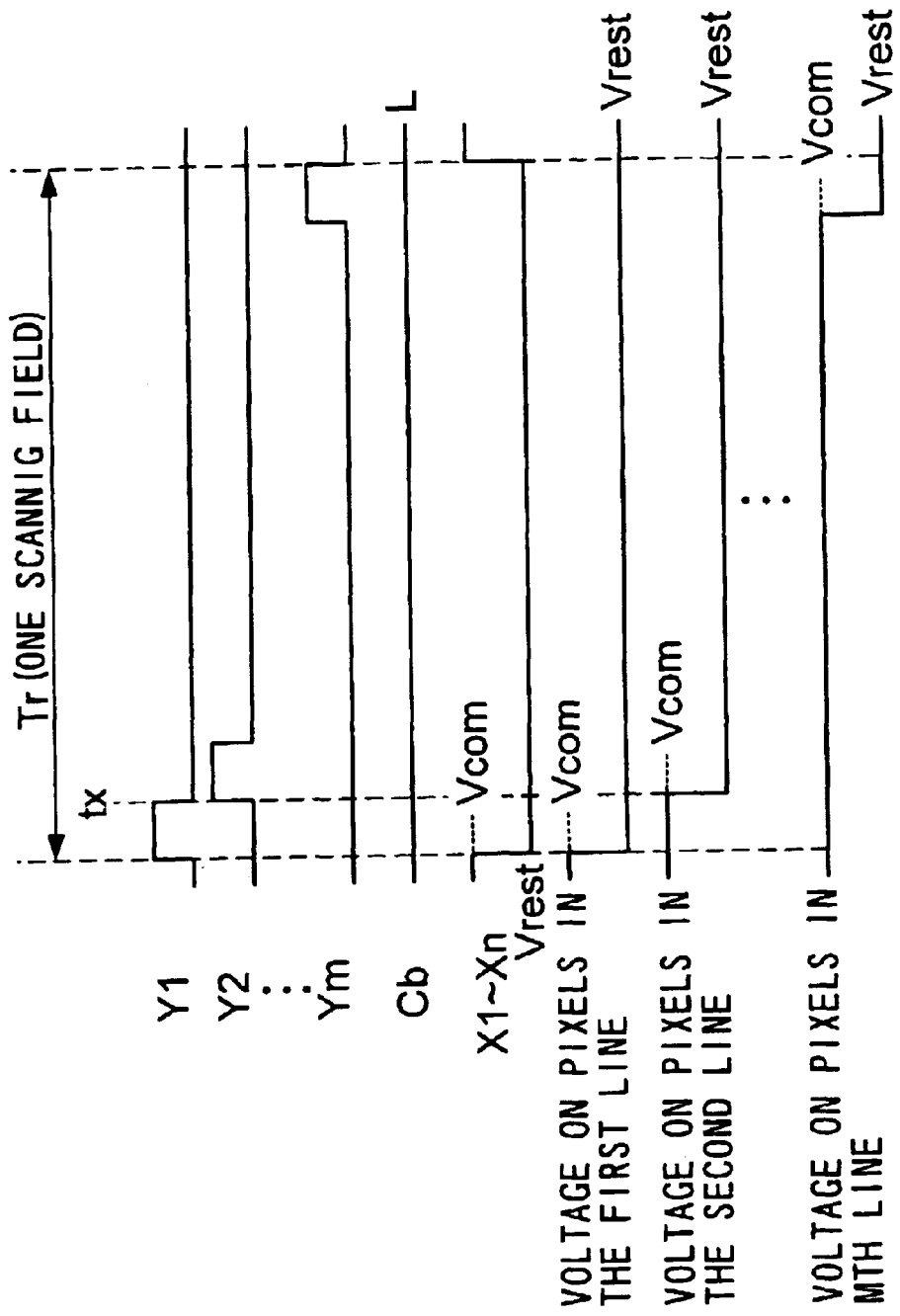
FIG. 9 is a timing chart of the electrophoretic display in the resetting operation.

FIG. 9 is a timing chart of an electrophoretic display in a resetting operation. As mentioned above, in the reset period Tr, the reset data Drest is supplied to the data line drive circuit 140A. In this period, no-bias signal is inactive (the L-level) as shown in FIG. 9, as a result, the voltages of data lines signals X1, . . . , Xn are all equal to the reset voltage Vrest.

In this embodiment, the reset voltage Vrest is negative compared to the common voltage Vcom of the common electrode, because the pigment particles are positively charged.

At this time, when the scanning signal Y1 becomes active (the H-level), TFTs 103 in the first line are switched on and the reset voltage Vrest is applied to each pixel electrode 104. After that, reset voltage Vrest is applied to each pixel electrode 104 of the second, third, . . . , mth lines. For exemple, at time tx, when the scanning line signal Y1 is made inactive, each TFT 103 in the first line is switched off so that the pixel electrodes 104 and data lines 102 are cut off. However capacity has been created in the system comprised of the pixel electrode 104, dispersal system 1 and the common electrode 201. Hence if each TFT 103 is switched off, the reset voltage Vrest is maintained between the pixel electrode 104 in the first horizontal line and the common electrode 201.

In that way reset voltage Vrest is applied between the two electrodes, pigment particles 3 in the dispersal system 1 are attracted and their positions are initialized.

(2) Writing Operation

Figure 10:
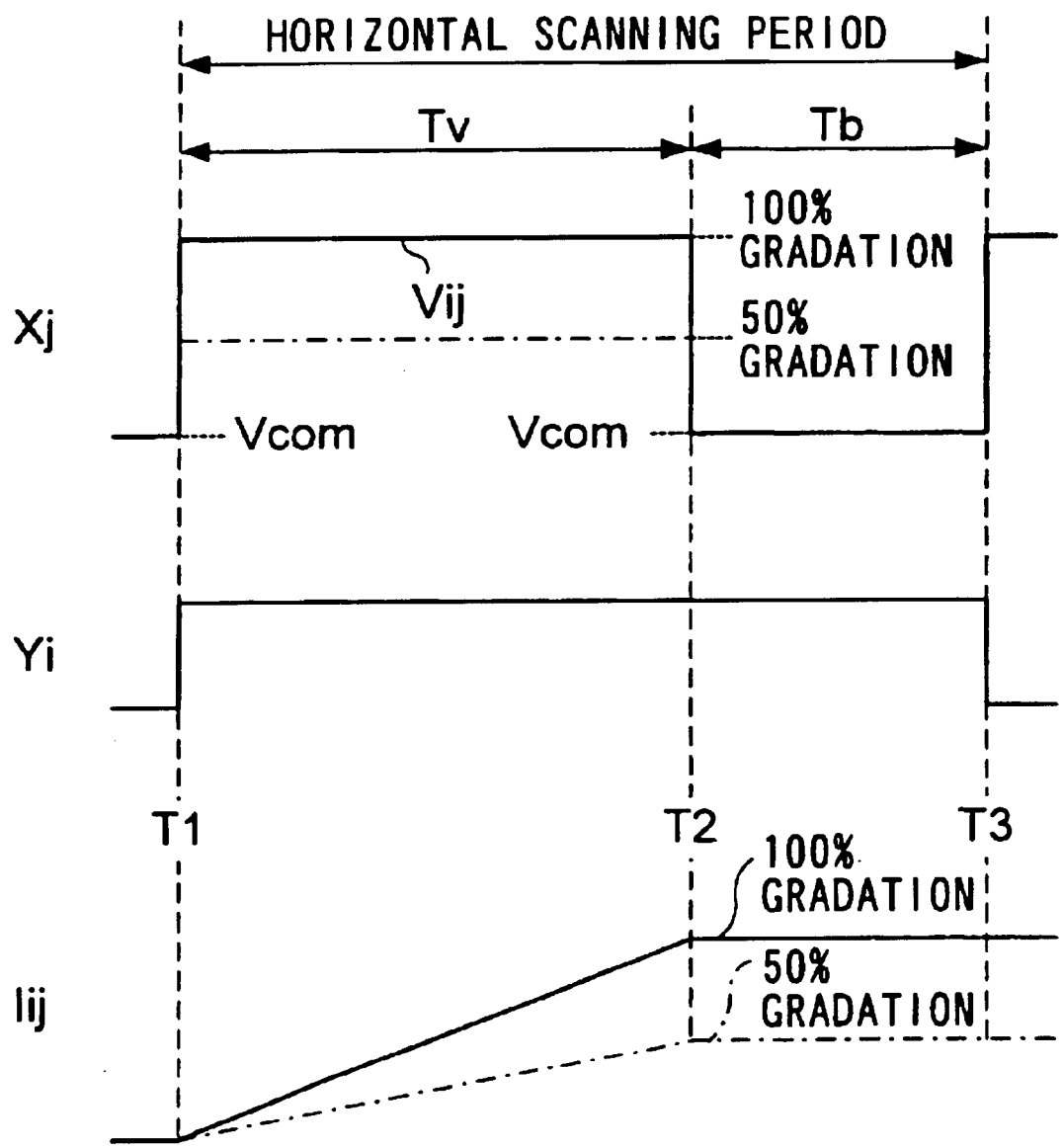
FIG. 10 is a timing chart of the electrophoretic display in the writing operation.

FIG. 10 shows a timing chart of the electrophoretic display in an operation of writing. Here is depicted about ith line (ith scanning line) and jth column (jth data line) but it is obvious that other pixels can betreated likewise. In the following, the pixel of ith line and jth column is represented by Pij, the gradation voltage to be displayed in the pixel Pij is represented by Vij and the brightness if Pij is represented by Iij.

Since each data line X1, . . . , Xn is generated through the D/A conversion of data Dc1, . . . , Dcn as shown in FIG. 7, the voltage of the data line signal Xj is, as shown in FIG. 10, equals to the gradation voltage Vij in the voltage applied period Tv from time T1 to time T2, while to the common voltage Vcom in the no-bias period Th from time t2 to time t3.

The scanning line signal Y1 supplied to the ith scanning line 101 is active during the period of the ith the horizontal scanning. Therefore, the TFT 103 which comprises the pixel Pij is switched on over that period and the data line signal Xj from time T1 to time tme T3 is applied to the pixel electrode 104. That is, in this embodiment, an operation that begins with applying the gradation voltage Vij to the pixel electrodes 104 and ends with applying the common voltage Vcom thereto is completed within a period of one horizontal line scanning.

In the following, the pigment particles' motion will be described in the pixel Pij. Being done the reset operation before the writing operation begins, at time T1, all pigment particles of the pixel Pij are positioned on the side of the pixel electrode 104. At this time when the voltage 104 Vij is applied to the pixel electrode 104, an electrostatic field is generated in the direction of from the pixel electrode 104 to the common electrode 201. Thus the particles 3 start to move at time T1.

In this embodiment, since the particles 3 are white and dielectric fluid 2 is black, the more pigment particle 3 is nearing to the common electrode 201, the higher the brightness Iij of the pixel Pij is. As a result, Iij is becomes higher gradually from time T1 as shown therein.

Since the pixel Pij is composed of a dispersal system 1 sandwiched by a pixel electrode 104 and the common electrode 201, it has the capacitance depending upon the area of the electrodes, the distance between the two electrodes, and dielectric constant of the dispersal system 1.

Accordingly, even if TFT 103 is turned OFF to brake supplying charges to the pixel electrode 104, since the capacitor accumulates some charge, electrostatic field with a constant strength being generated between the two electrodes. Thus, since pigment particles 3 continue to migrate to common electrode 201 for as long as an electrostatic field is applied, a period in which generation of the electrostatic field is stopped, in other words, a process to remove extra charges accumulated in the capacitance is required. Consequently, the no-bias period Tb is set.

In the no-bias period Tb, since the common voltage Vcom is applied to the pixel electrode 104, the pixel electrode 104 and the common electrode 201 becomes equipotential at time T2. This means no electrostatic field is applied to pigment particles 3 from that time. If the fluid resistance of the dielectric fluidis, to some extent, large, the particles 3 stop moving at time T2 when no electrostatic field exists. This results in a constant value of brightness Iij from time T2 as shown therein.

If the value of the fluid resistance of the dielectric fluid 2 is small, the pigment particles 3 keep moving for a period due to their inertia. In this case, the image D which is compensated beforehand by taking the above effect into account is generated in the image signal processing circuit 300A.

In this operation of writing, brightness Iij of the pixel Pij can be controlled based on the gradation to be expected such that after the voltage Vij is applied to the pixel electrode 104 to move the pigment particles 3 by the distance according to the gradation to be displayed, then the common voltage Vcom is applied thereto to brake the moving pigment particles.

In this embodiment the common voltage Vcom is applied to brake pigment particles 3, but it is not necessary to apply the same voltage, which completely equals to the common voltage Vcom, instead any voltage, which is able to brake moving pigment particles 3 is possible.

Since the particles 3 are not able to migrate simply by overcoming fluid resistance, if the value of the fluid resistance of the dielectric fluid is large it may be necessary to apply a voltage which is somewhat different from the common voltage Vcom.

(3) Holding Operation

In FIG. 7, at time T3, since the scanning line signal Y1 shifts from active to inactive, the TFT 103 of the pixel Pij is turned off. As mentioned above, in the no-bias period Tb, since the common voltage Vcom is applied to the pixel electrode 104, no electrostatic field is generated between the two electrodes. Therefore no electrostatic field is applied to the dispersal system 1 unless a new voltage is applied. This enables the position pigment particles 3 to be held, and thus a displayed image to be held.

In such a holding period Th, since there is no need to apply a voltage to pixel electrodes 104, and consequently neither the scanning line signal Y1, . . . , Ym nor the data line signal X1, . . . , Xn need be generated, thereby enabling a reduction in power consumption in this period as follows:

First the main power supply of the electrophoretic display is turned off. This means that the electrophoretic display panel and peripheral devices such as the image signal processing circuit 300A and the timing generator 400 halt and no power is consumed.

The second is to brake supplying power to the electrophoretic display panel A. This reduces power consumption.

The third is to stop supplying the Y-clock YCK, the inverted Y-clock YCKB, the X-clock XCK, the inverted X-clock XCKB to the scanning line drive circuit 130, and the data lines driving circuit 140A. Since the scanning line drive circuit 130 and the data line drive circuit 140A is made of complementary TFTs as described above, power is consumed only when the current is fed therethrough, in other words, inversion of a logic level occurs. Consequently, stopping the supply to the clocks enables a reduction in power consumption.

(4) Rewriting

Rewriting is carried out as follows:

The first method is as follows. After a reset operation is carried out, as described above, sequentially on a line-by-line basis, the writing operation is also carried out sequentially on a line-by-line basis, and a common voltage followed by a gradation voltage is applied to the pixel electrodes 104. This enables frame rewrite of an image.

Figure 11:
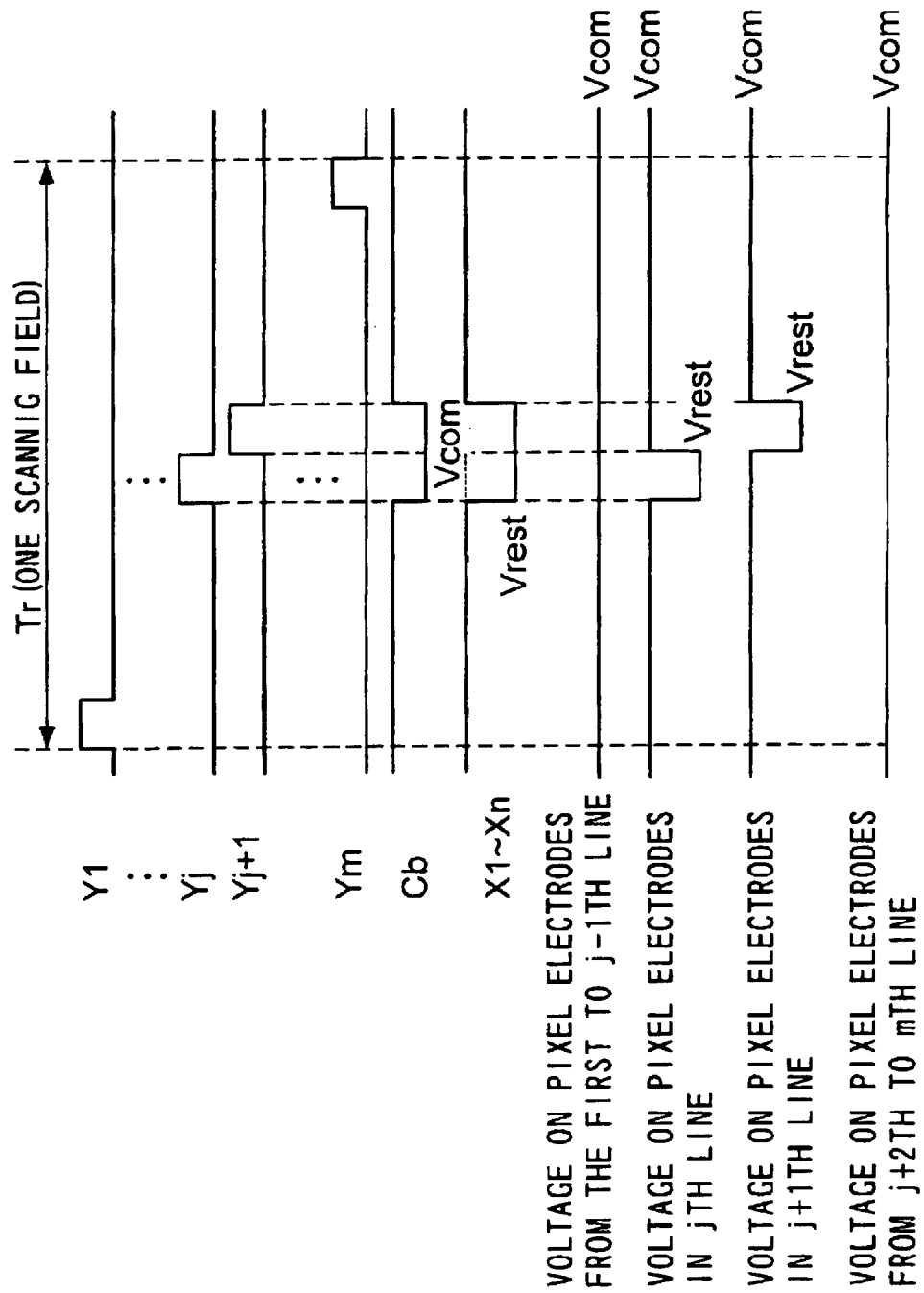
FIG. 11 is a timing chart of the resetting operation in the second manner.

The second method consists of a resetting and rewriting operation carried out only in the lines where rewriting is required. Suppose the jth and the j+1th lines are to be rewritten by way of example. FIG. 11 shows a timing chart describing an operation of resetting in this method.

The second method is that, in the resetting period Tr, the image signal processing circuit 300A outputs the reset data Drest. And at this time, the scanning line driving circuit 130 sequentially outputs the scanning signal Y1, . . . , Yj, Yj+1, . . . , Ym as shown therein. While the no-bias timing signal Cb is in the L-level during the scanning line 101 necessary to be rewritten is selected. Since jth and j+1th lines are rewritten, the no-bias timing signal Cb is in the L-level (inactive) when the scanning line signal Yj and Yj+1 are active.

As described above, while the selection circuit 144 (cf. FIG. 6) outputs the common voltage data Dcom during the no-bias timing signal Cb is in the H-level (active) and outputs the outputted data Db1, . . . , Dbn of the latch 143 during the no-bias timing signal Cb is in the low level. In other words, in the period which jth and j+1th scanning line 101 are selected, the reset voltage Vrest is supplied to all data lines 102, while in the other selected time of the scanning line 101, the common voltage Vcom is applied to all data lines 102.

Therefore while the common voltage Vcom is applied to the pixel electrodes 104 on from the first to the j−1th line and from the j+2th to the mth line, the reset voltage Vrest is applied to the pixel electrodes 104 of the jth and j+1th line, so that the pixels of the j th and j+1th lines are initialized. Since applying the common voltage Vcom to the pixel electrodes 104 generates no electrostatic field, the positions of pigment particles 3 in the pixels on from the first to the j−1th line and from the j+2 to the mth line don't change.

In the writing operation, writing is carried out in the manner as shown in FIG. 7, so that the image signal processing circuit 300A outputs the image data D to the line to be rewritten, while the common voltage data Dcom to the other lines. This enables rewriting only in the jth and j+1th lines.

The third method is that after a plurality of electrodes is reset, they are rewritten in the usual way. In the above second method, a reset operation is carried out line by line in such a way that first the jth line is reset then the j+1th line is reset and so on.

Figure 12:
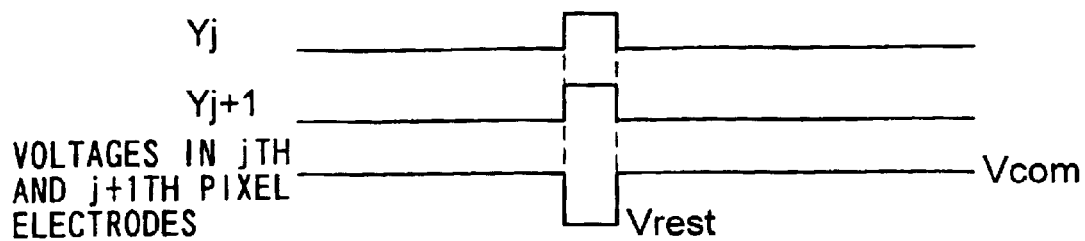
FIG. 12 is a timing chart of the resetting operation which resets horizontal lines simultaneously.
Figure 13:
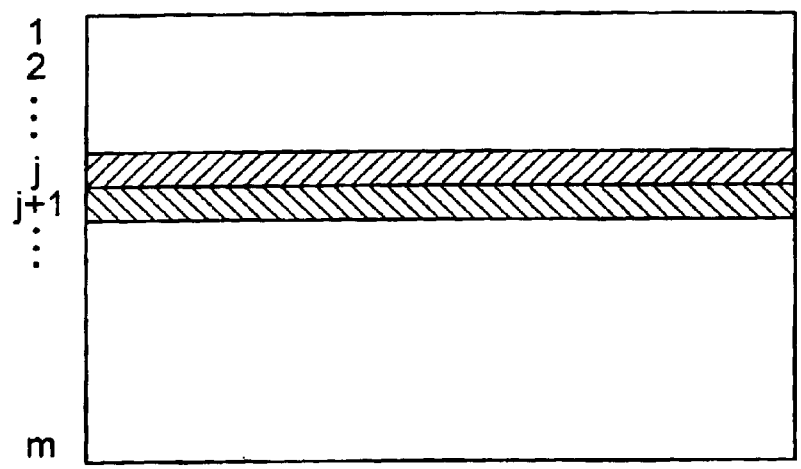
FIG. 13 illustrates the horizontal lines to be rewritten.

However, it is possible to reset simultaneously if a scanning line drive circuit which simultaneously select a plurality of scanning lines 101 to be rewritten. For example, as shown in FIG. 12, it is obvious that it is possible to reset simultaneously jth and j+1th line to be rewritten if the reset voltage Vrest is applied to the data lines 102 activating only the scanning line signal Yj and Yj+1. Writing is carried out in the usual way, as shown in FIG. 7 that the image signal processing circuit 300A outputs the image data D only in the line to be rewritten, then the common voltage data Dcom is outputted to the other lines. This method enables rewriting only in the jth and j+1 line.

The fourth method is that after a region to be rewritten is simultaneously reset, a new voltage is applied to the pixels which belong to the region.

Figure 14:
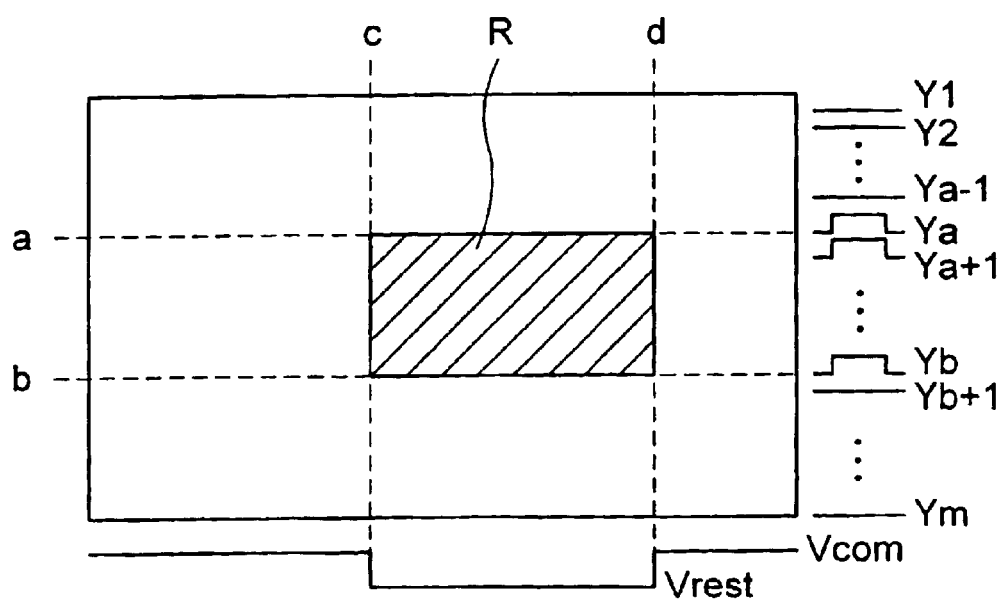
FIG. 14 illustrates the reset operation by the region.

Suppose that the region R to be rewritten is from ath to bth line and from cth to dth column as shown FIG. 14.

First, the scanning line drive circuit is used which can rewrite simultaneously a plurality of the scanning lines 101 to be rewritten. The image signal processing circuit 300A outputs the data as the data of one line, which is the common voltage data Dcom for from the first to the c−1 th line and while is the reset data for from the cth to the Dth line and the common voltage data Dcom for from d+1th to the nth line. The no-bias timing signal remains to be inactive. This enables that the data lines signal from X1 to Xc−1 and from Xd+1 to Xn is set to the common voltage Vcom during the horizontal scanning, while the data lines signal from Xc to Xd is set to be the reset voltage Vrest. In the horizontal scanning period, the scanning line signal only from Ya to Yb can be set to active so as to reset the region R. In writing, the image signal processing circuit 300A outputs the image data D to the pixels corresponding to the region R, while the common voltage data Vcom to the others. Rewriting only of the region R is carried out in this way.

Figure 15:
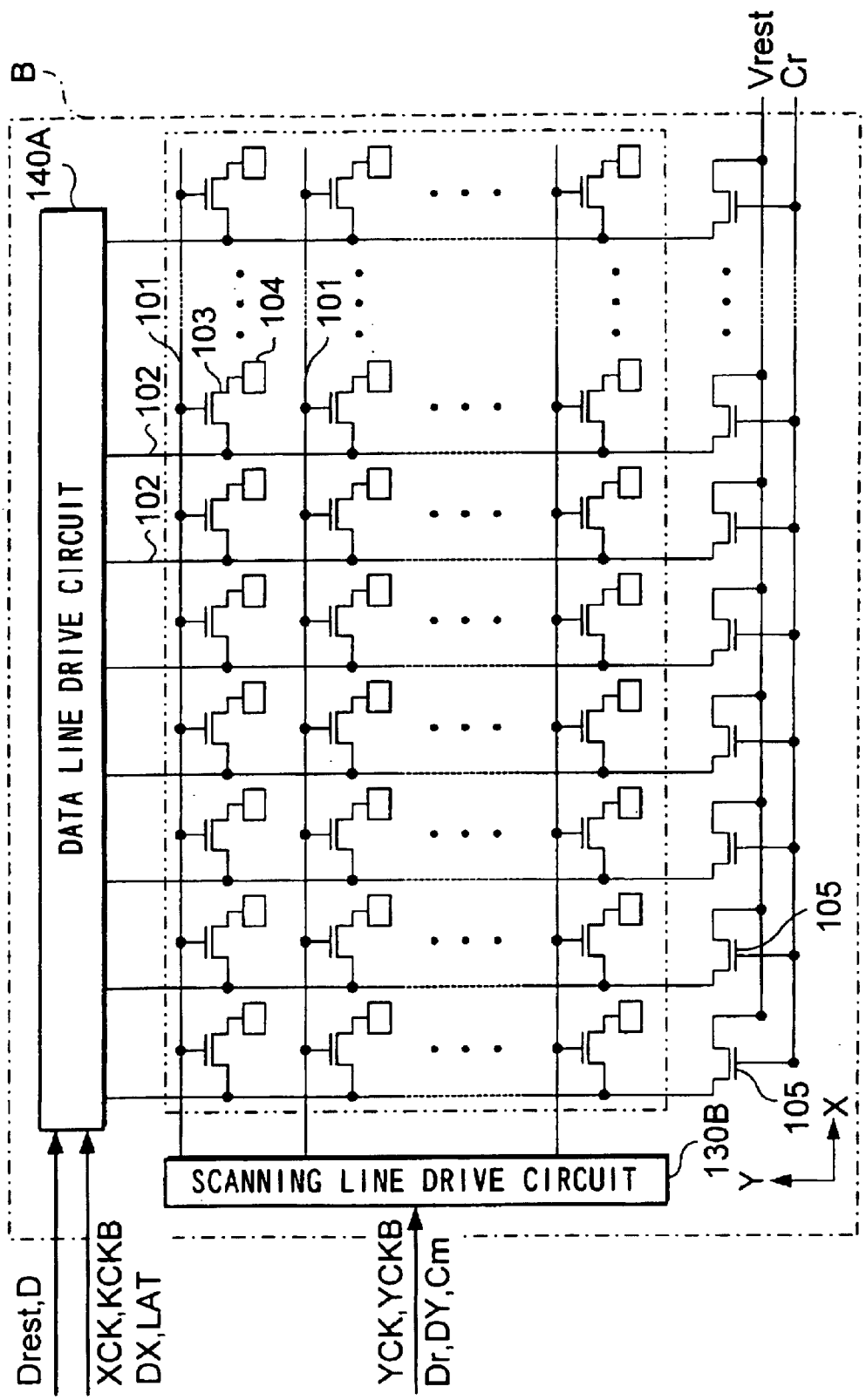
FIG. 15 is a block diagram of the electrical configuration of the electrophoretic display panel in the fifth manner.

The fifth method is carried out such that after all the pixels are reset simultaneously, rewriting is carried out in the ordinary manner of writing. FIG. 15 shows a block diagram of the electrophoretic display panel B in this manner. The electrophoretic display panel B has the same configuration as the electrophoretic display panel A shown in FIG. 3 except that TFTs 105 are set in each line and that the image scanning driving circuit 130B is able to simultaneously become active the scanning line signals from Y1 to Ym.

In FIG. 5 the reset voltage Vrest is applied to source electrodes on each TFT 105 and reset timing signal Cr is applied to gate electrodes thereon and those drain electrodes is connected with each data lines 102. The reset timing signal Cr generated in the timing generator 400 becomes active during the reset period Tr. When the reset timing signal Cr is active, all TFTs is turned on simultaneously so that the reset voltage Vrest is applied to each data line 102. On the other hand, the scanning driving circuit 130B makes all scanning line signals active when the reset timing signal Cr is turned to active.

Hence the reset voltage Vrest is applied to all the pixels 104 during the reset timing signal Cr is active. This leads to the simultaneous resetting of all the pixels.

In this case, it may be possible that source electrodes on each TFT to be set at ground level, and the voltage, instead of the common voltage Vcom, is used to apply a positive voltage with reference to the ground potential which is sufficient to initialize. That is, with reference to either a pixel electrode 104 or the common electrode 201, sufficient voltage to initialize another electrode is applied.

It is also possible for the voltage for initializing to be applied to the pixel to which the region of the image to be rewritten belongs.

(B) Second Embodiment

Figure 16A:
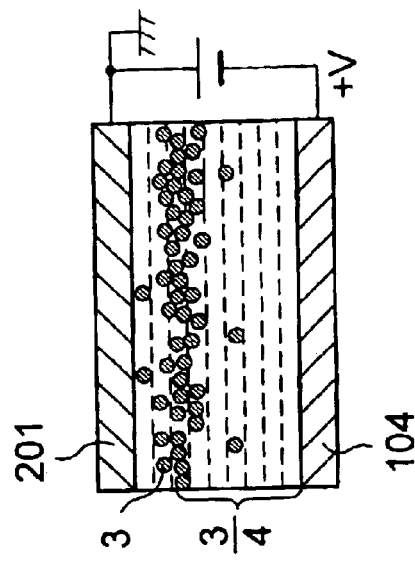
FIG. 16 is a simplified partial sectional view of the divided cell of the electrophoretic display.
Figure 16B:
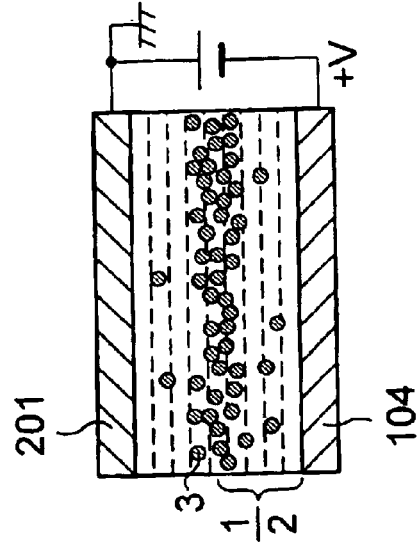
Figure 16C:
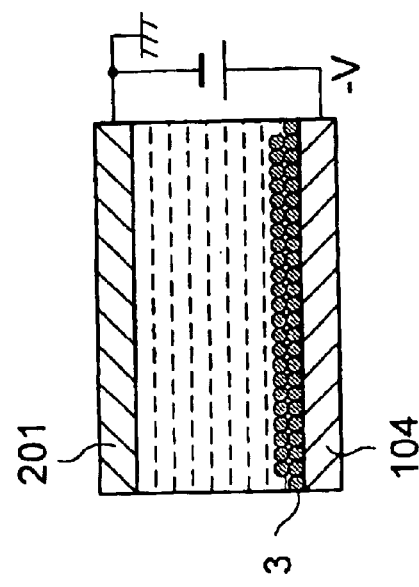

In the above embodiment, rewriting is carried out in a way that after a reset operation as shown in FIG. 16A is carried out, then a writing operation is carried out shown in FIG. 16B to renew a displayed image. In this case, the positions of the pigment particles 3 are initialized in displaying a subsequent image. In the case that dielectric fluid 2 is colored black and the pigment particles 3 are colored white, a black out occurs across the entire image. However, if a change in image is effected sufficiently rapidly, it will not be visible to the naked eye. Nevertheless there is a case that the resetting operation needs a long time according to physical property of the dispersal system 1, which results in the fact that change of the brightness in initializing the pigment particles 3 can be detected.

In order to deal with the above situation, it is possible that the voltage which corresponds to the difference between the average position to be displayed next and that corresponding to the presently displayed image is applied between the two electrodes for a constant time. Suppose the present gradation is 50% and the gradation to be displayed next is 75%, for example. If the average position of the pigment particles 3 is 50% the thickness direction of the dispersal system 1, the gradation displayed is 50%, as shown in FIG. 16B. In order to change this gradation to that of 75%, it is necessary to move the particles 3 to a position of ¾ in the thickness direction. Consequently the voltage, which corresponds to the difference between the gradation to be next displayed and that of now displayed, is applied to the pixel electrodes 104 to move the pigment particles 3 to the appropriate position. This realizes a renewing of a displayed image without a resetting operation, which will lead to smooth displaying of an animation. In the following, only a difference compared to the first embodiment will be described.

(B-1) Image Signal Processing Circuit 301A

Figure 17:
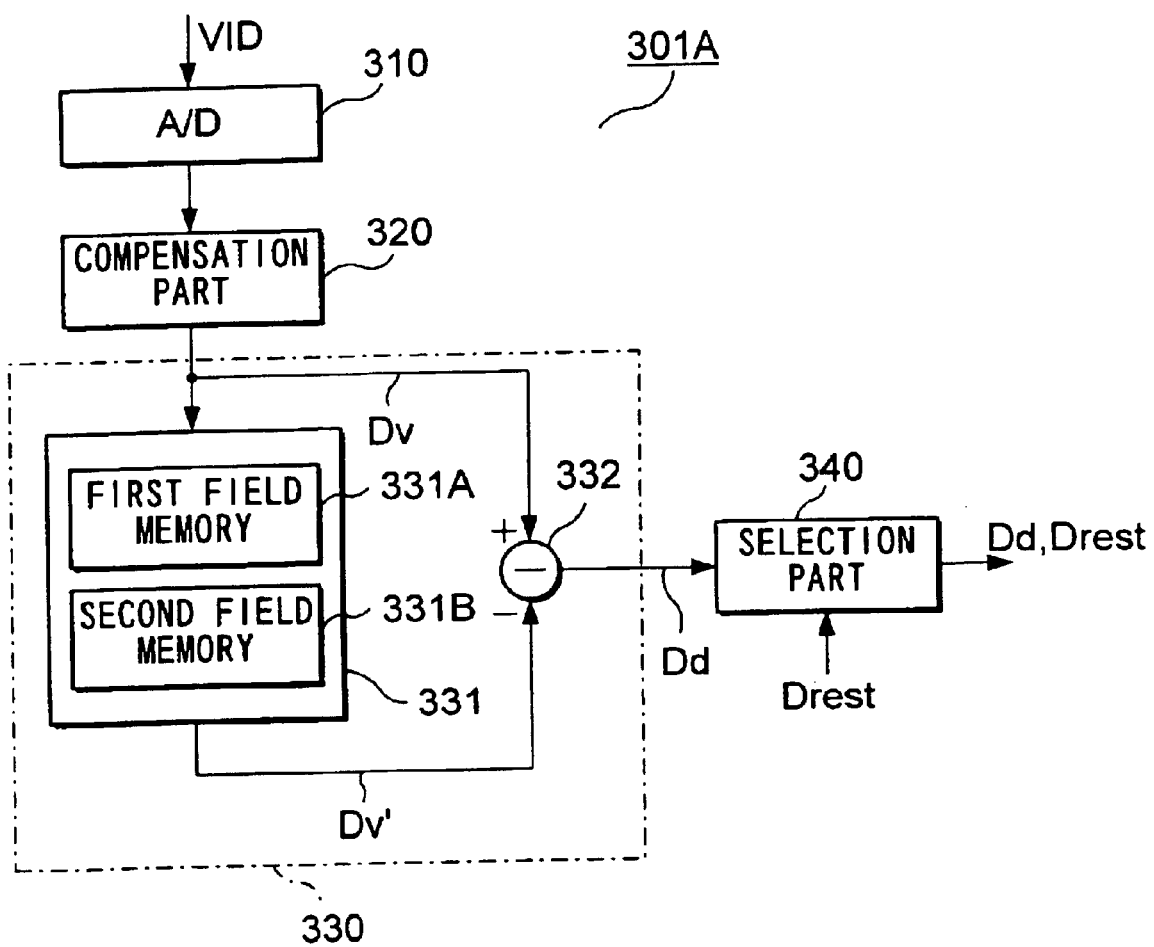
FIG. 17 is a block diagram showing the configuration of the image signal processing circuit 300A' based on the second embodiment.

FIG. 17 is a block diagram showing a configuration of a image signal processing circuit 301A. The image signal processing circuit 301A is comprised of an A/D converter 310, a compensation part 320, a calculation part 340. An externally supplied signal VID is supplied to the compensation part 320 through the A/D converter 310 as an input image data Din. The compensation part has a ROM and others and generates an image data Dv undergoing compensation processing such as gamma correction, and output it to a calculation part 330.

The calculation part 330 has a memory 331 and a subtracter 332. The memory 331 has the first field memory 331A in which writing is executed in odd fields, while reading is executed in even field and has the second field memory 331B in which writing is executed in an even field. The memory 331 delays the image data Dv by one field which is supplied to the other input terminal of the subtracter 332 as the delayed image data Dv'.

Then the subtracter 332 generates the differential image data Dd by subtracting the delayed image data Dv' from the image data Dv and output it. The selection part 340 selects the reset data Drest in the reset period Tr, while outputs the differential image data Dd in the wirting period Tw. It should be noted that, in the first field, since there is no delayed image data Dd, a dummy data whose value is '0' is supplied to the other input terminal of the subtracter 332. Hence the image data Dv is outputted as the differential image data Dd in the first field. If the delayed image data Dv' is the present gradation displayed, the image data Dv is equivalent to the gradation to be displayed next. Therefore the differential image data Dd is equivalent to the data which corresponds to the difference between the gradation to be next displayed and that of now displayed.

Since configurations of drive circuit and data line circuit in this embodiment is similar to that of the first embodiment, explanation is omitted.

(B-2) Operation in the Second Embodiment

Figure 18:
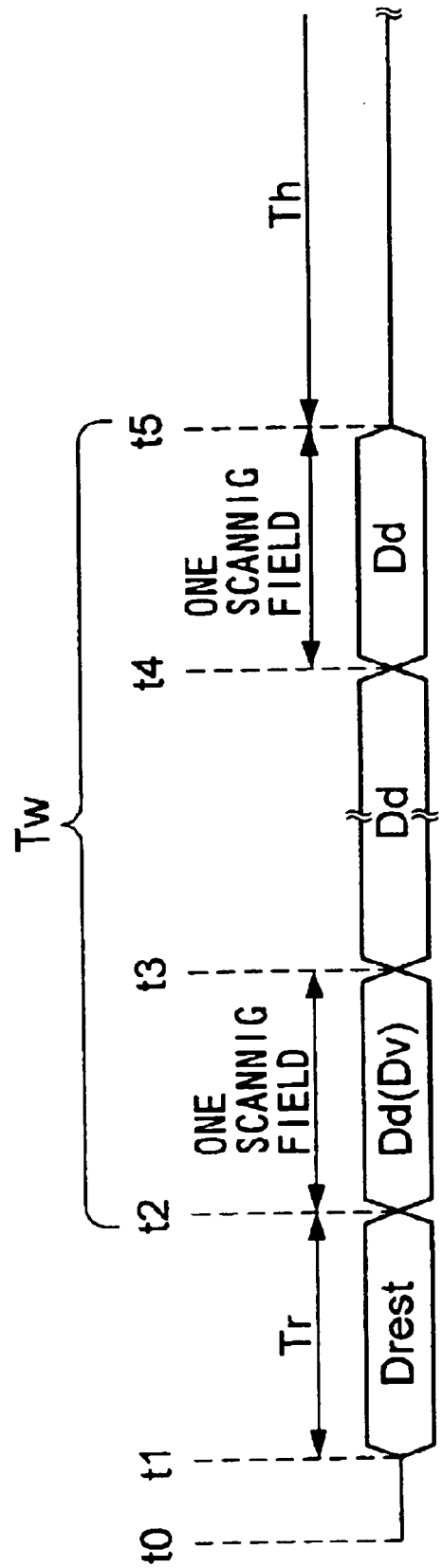
FIG. 18 is a timing chart of the outputted data from the image signal processing circuit 300A'.

FIG. 18 is a timing chart showing the output data from the image signal processing circuit 301A.

First, at time t2, the writing period Tw begins. In this period, the image signal processing circuit 301A output the differential image data Dd. Hence the differential voltage Vd, which corresponds to the difference between the gradation to be next displayed and the present gradation, is applied to each pixel electrode 104 except that in the first field (from time t2 to t3), the image data Dv is supplied as the differential image data Dd to the data lines drive circuit 130, which means that the voltage to be displayed is applied to each electrode 104. However, since, at time t2, the gradation displayed is set to 0% (or 100%) having done the resetting, the operation in the first period is essentially equivalent, in the viewpoint of it's basic function, to that the differential voltage Vd which corresponds to the difference between the gradation to be next displayed and the present gradation is applied even in the first field.

Similarly, after the image is displayed in the first field, the voltage which corresponds to the gradation difference is applied in the next field and so in the following field.

Figure 19:
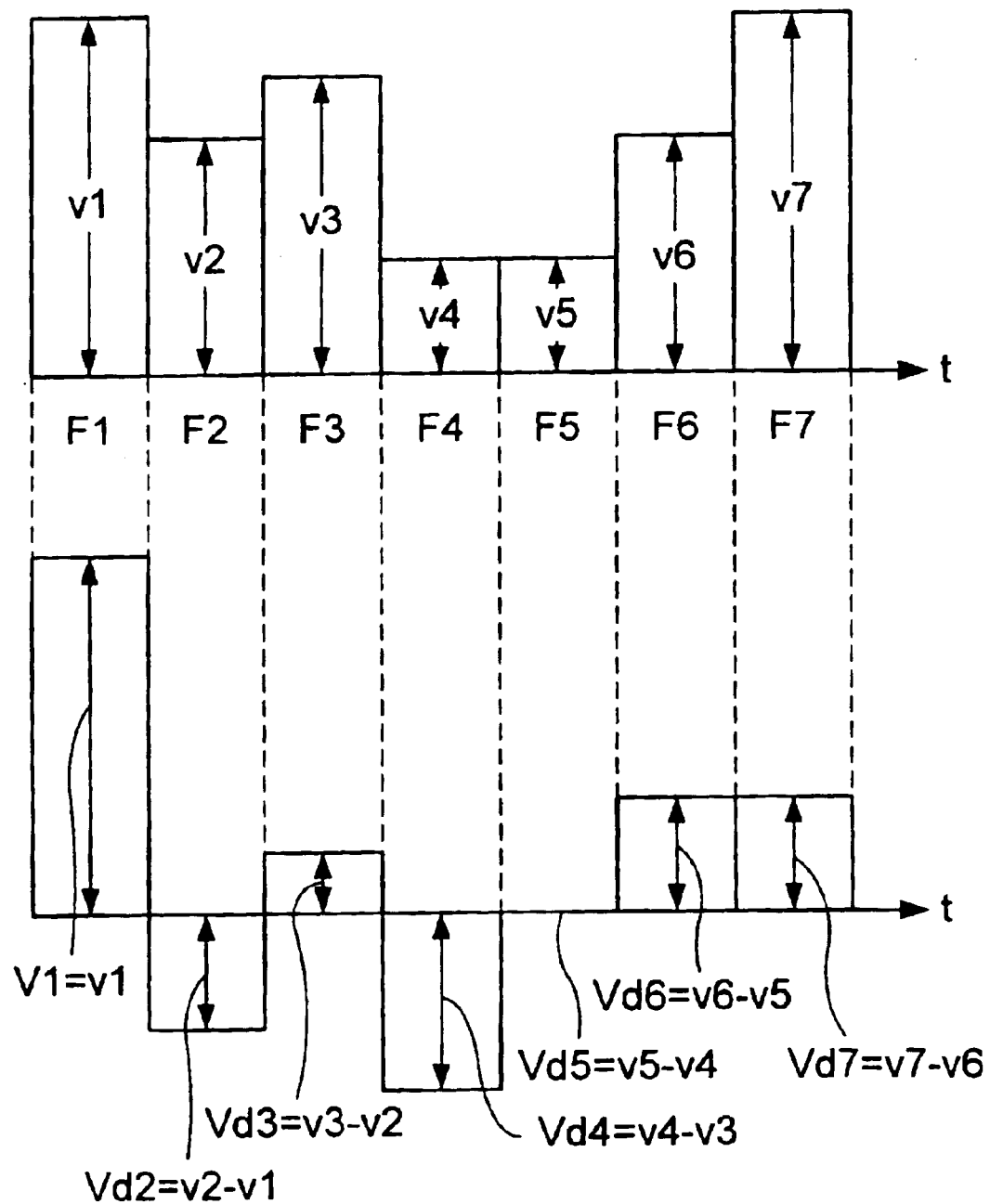
FIG. 19 exemplify the relation of the gradation voltage and the differential gradation voltage.

For instance, if the gradation voltage at a pixel changes such as v1, v2, . . . , v7 accordingly from the first field F1 to the seventh field F7 as shown in FIG. 19A, the differential voltage Vd are Vd1, Vd2, . . . , Vd7 accordingly as shown in FIG. 19B.

In the holding period Th (after time t5), a static image is displayed likewise in the first embodiment.

(B-3) Writing Operation

Figure 20:
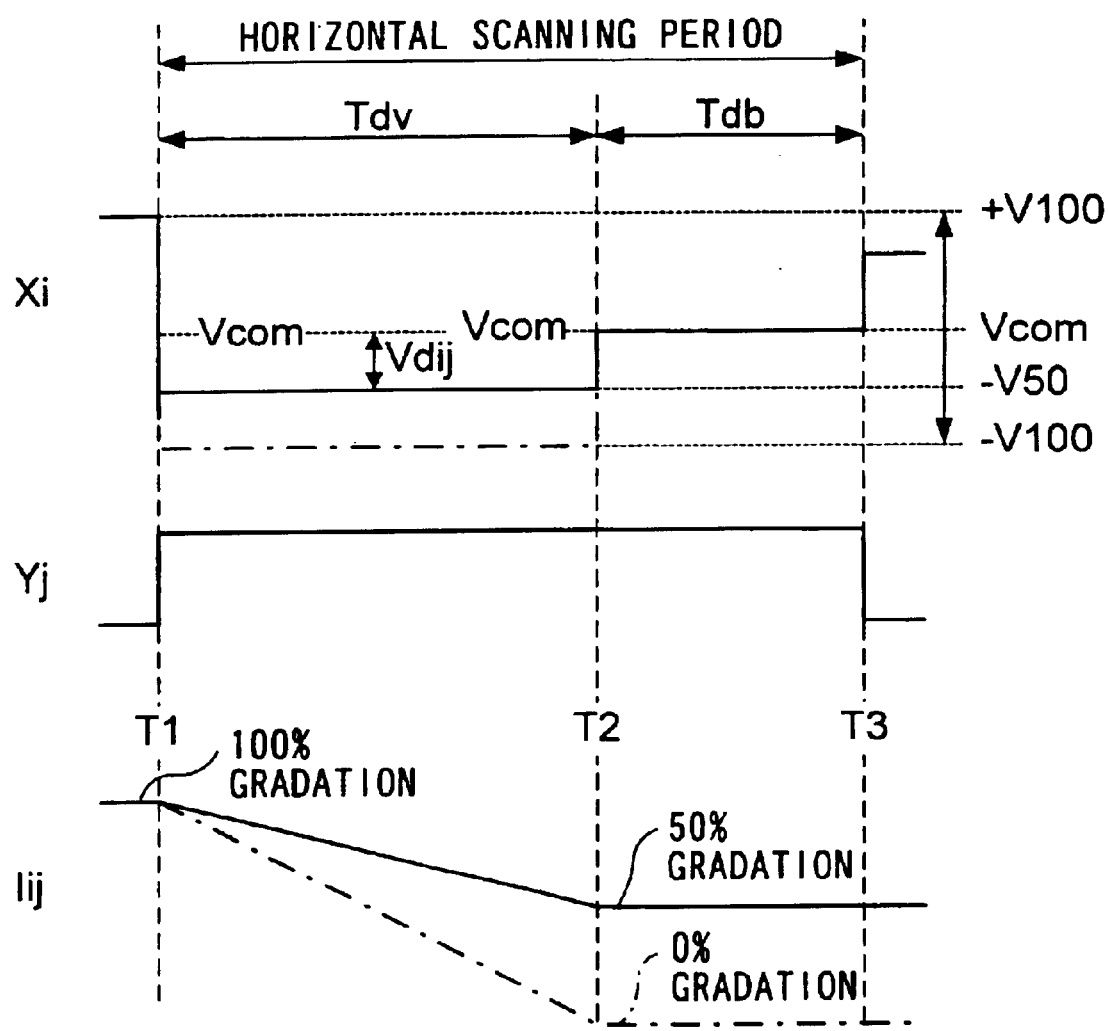
FIG. 20 is a timing chart of the electrophoretic display in the writing operation.

FIG. 20 shows a timing chart of the electrophoretic display in the writing operation. Here is depicted about ith line (ith scanning line) and jth column (jth data line) but it is obvious that other pixels can be, of course, dealt likewise. In the following, the pixel of ith line and jth column is represented by Pij, the differential voltage to be displayed in the pixel Pij is represented by Vdij and the brightness of Pij is represented by Iij. Suppose the pixel Pij displayed 10% in the next previous field and also required voltage to change from the displayed gradation 0% (all pigment particles 3 are on the side of the pixel electrodes 104) to the displayed gradation 100% (all pigment particles are on the side of the common electrodes is represented by +V100 with respect to the common voltage Vcom. Similarly, required voltage to change from 100% to 0% is represented by −V100.

Since each data line X1, . . . , Xn is generated through the D/A conversion of data Dc1, . . . , Dcn as shown in FIG. 7, the voltage of the data line signal Xj is, as shown in FIG. 20, equals to the differential voltage Vdij in the differential voltage-applied period Tdv from time T1 to time T2, while to the common voltage Vcom in the no-bias period Tb from time t2 to time t3.

Provided that the gradation to be displayed in the present field 50%, the value of the differential voltage Vdij is −V50 indicated as the solid line therein because the voltage decreases by 50% from the next previous one. By another way of example, if the gradation to be displayed in the present field is 0%, the value of the Vdij is −V100 indicated as the dotted line therein.

(C) Third Embodiment

In the first embodiment, as described before, after the gradation voltage is applied to the pixel electrodes 104 to move the pigment particles 3 by the distance correspondent to the gradation to be displayed, the common voltage Vcom is applied to the pixel electrodes 104 not to apply any electrostatic field to the particles 3. Additionally, the image data D is compensated at the image signal processing circuit 300A before outputting taking the inertia into consideration, in case of small fluid resistance of the dielectric fluid, which means that the particles 3 continue to move under inertia.

However, it can take a considerable time for pigment particles 3 to become stationary depending on the level of fluid resistance encountered in dielectric fluid 2. In the above example, since pigment particles 3 migrate away from pixel electrodes 104 to the common electrode, if there is little fluid resistance the image displayed will not reach optimum brightness in a desired time. In the third embodiment, an electrophoretic display designed to prevent fluctuations in brightness is provided. It is configured in the same manner as that of the first embodiment shown in FIG. 3, except that image signal processing circuit 300B and data line drive circuit 140B is used instead of the image signal processing circuit 300A and the data line processing circuit 140A.

(C-1) Image Signal Processing Circuit

Figure 21:
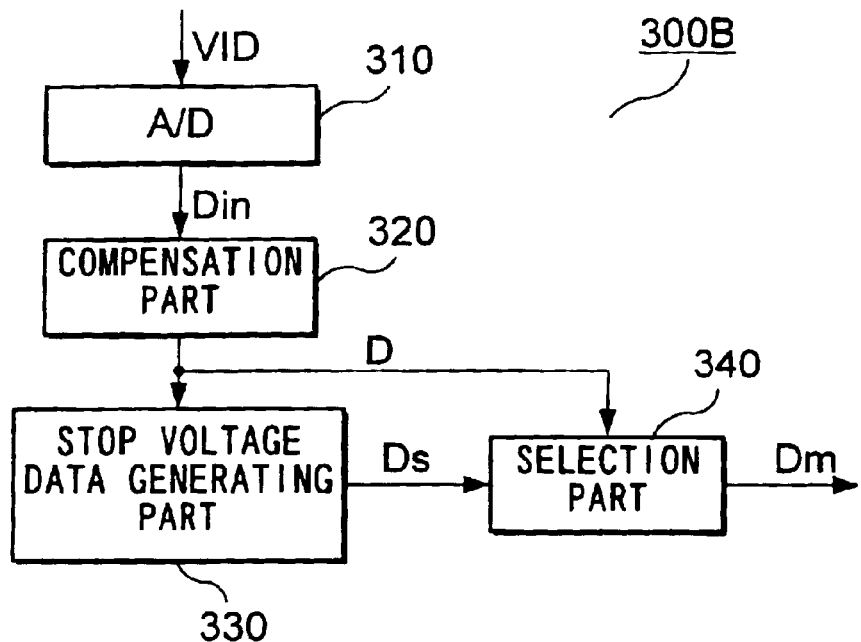
FIG. 21 is a block diagram of the image signal processing circuit 300B of the electrophoretic display based on the second embodiment.
Figure 22:
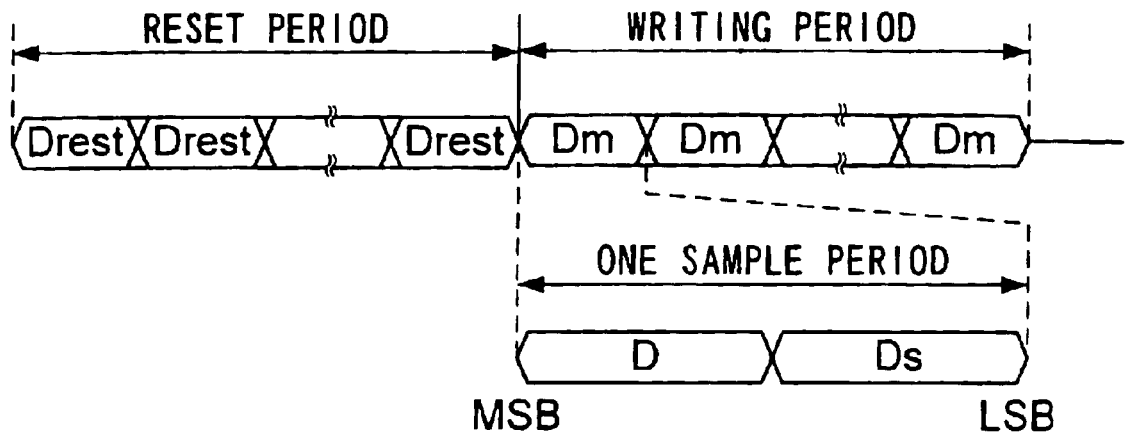
FIG. 22 is a timing chart of the outputted data from the image signal processing circuit 300B.

FIG. 21 is a block diagram of image signal processing circuit 300B and FIG. 22 is a timing chart for output data.

As shown in FIG. 21, an image signal processing circuit 300B is provided with an A/D converter 310, a compensation part 320, a brake voltage generation part 330 and a selection part 340. The image signal VID supplied externally through the A/D converter is supplied to the compensation part 320 as input image data Din. The compensation part is provided with a ROM or other suitable memory and generates an image data Dv undergoing compensation processing such as gamma correction.

The brake voltage generation part 330 is provided with a table in which the brake voltage data Ds and image data D having values corresponding to those of of Ds are memorized. In this way, the brake voltage data Ds is acquired by accessing the table and using image data D as an address. The table is provided with storage circuits such as RAM or ROM.

The brake voltage data Ds corresponds to the brake voltage Vs, which will be described later, and is used to brake pigment particles 3. As mentioned above, pigment particles 3 subject to inertial movement can be braked by utilizing a electrostatic field Coulomb force the direction of which is opposite to that of pigment particles 3. Since pigment particles 3 move in response to a gradation voltage for display of an image, it is necessary to apply an electrostatic field to them which is acting in an opposite direction, and the value of which is dependent on the kinetic energy of pigment particles 3, in other words, the gradation voltage V. Therefore, in this embodiment, taking into account fluid resistance of dielectric fluid 2 among other factors, the brake voltage data Ds corresponding to the values of the image data D is memorized in the table beforehand for reading.

As shown in FIG. 22, a selection part 340 outputs reset data in reset period Tr, while in the writing period, it outputs multiplex data Dm in which image data D and brake voltage data Ds are combined. If image data D consists of 6 bits and brake voltage data Ds is also 6 bits, the multiplex data Dm will be 12 bits, which means that 6 bits from the most significant bit (MSB) is the image data D and 6 bits from the latest significant bit (LSB) is the brake voltage data Ds.

(C-2) Data Line Drive Circuit

Figure 23:
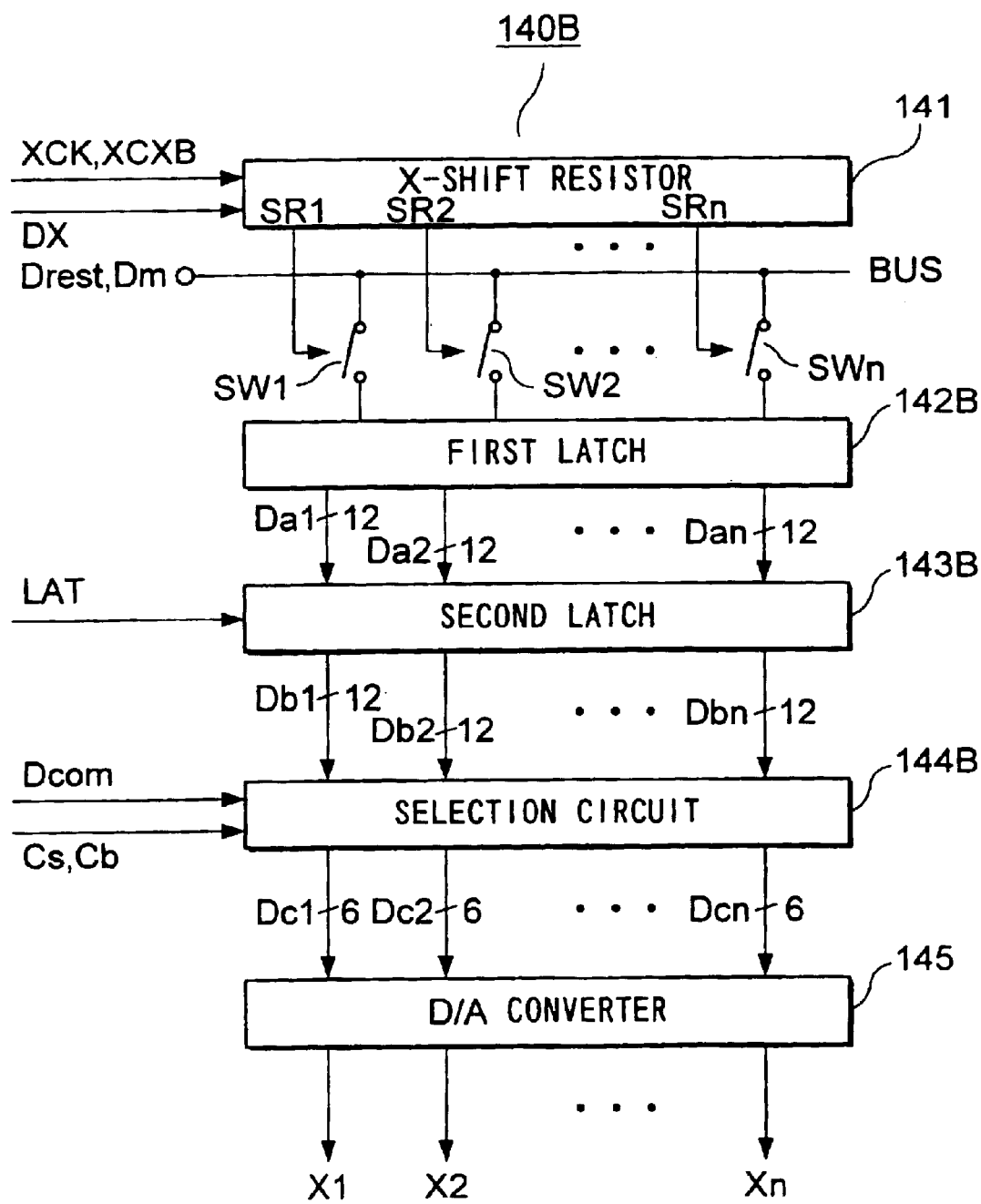
FIG. 23 is a block diagram of the data line drive circuit 140B thereof.

FIG. 23 shows a block diagram of a data line drive circuit 140B. In this embodiment, it is configured similarly to a data line drive circuit 140A in the first embodiment except that a first latch 142B and a second latch 143B latch 12 bits data and that a selection circuit 144B is used instead of a selection circuit 140B.

The first latch 142B generates dot-sequential data from Da1 to Dan latching 12 bits multiplex data Dm and the second latch 143B transforms the dot-sequential data from Da1 to Dan into line-sequential data from Db1 to Dbn. It should be noted that the reset data Drest in the resetting period is transformed into remains 6 bits line-sequential data remaining 6 bits.

Figure 24:
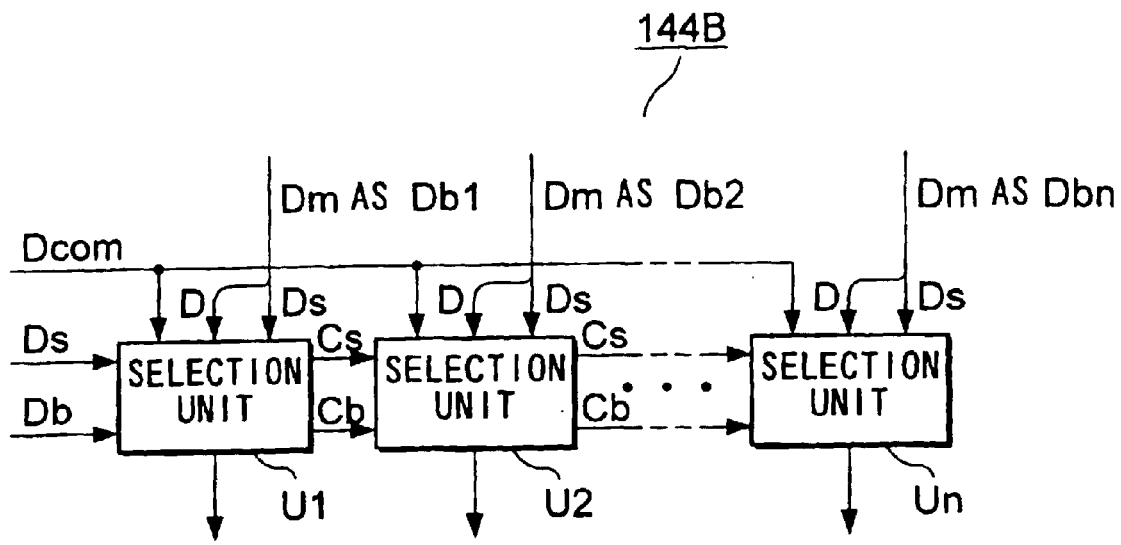
FIG. 24 is a bloc diagram of the detailed configuration of the selection circuit 144B in the data line drive circuit 140B.
Figure 25:
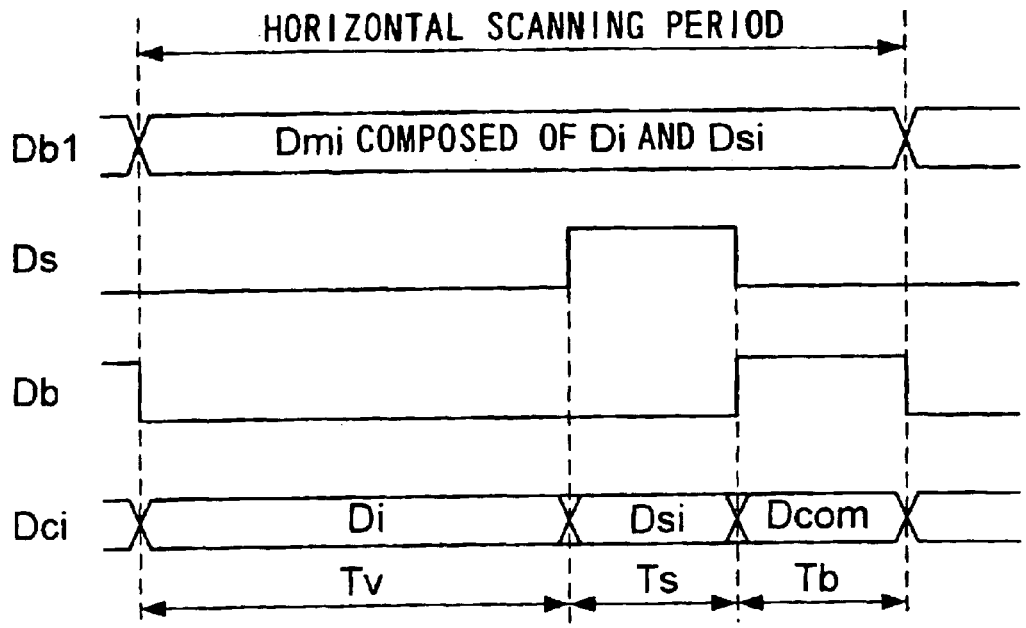
FIG. 25 is a timing chart showing the operation of the selection circuit 144B.

FIG. 24 shows a block diagram showing a detailed configuration of the selection circuit 144B and FIG. 25 shows the timing chart thereof. As shown in FIG. 24, the selection circuit 144B has n selection units from U1 to Un, each of which selects appropriate data from the image data D and the brake voltage data Ds, which is comprising the multiplex data Dm and the voltage data Ds, and outputs it, depending on the no-bias timing signal Cb and the stop timing signal Cb. The no-bias timing signal Cb becomes active (the H-level) only in the period in which the common voltage data Dcom is selected like in the fist embodiment described above, while the top timing signal Cs becomes active (in the H-level) only in the period in which the brake voltage data Ds is selected.

The selection circuit 144B selects and outputs the image data D when the both Cs and Cb is inactive (the L-level). When the Cs is active, it selects and outputs the brake voltage data Ds. When both Cs and Cb become active, it selects and output the common voltage data Dcom.

Suppose the multiplex data Dmi is supplied as the ith line-sequential data Dbi to the ith selection unit Ui in a certain horizontal scanning period as shown in FIG. 25, for example. In this case, it is the image data Di which is comprised of upper bits of the multiplex data Dm and the brake voltage data Dsi which is comprised of the lower bits of Dm that is supplied to the selection circuit 144B. In the voltage applied period Tv, both the stop timing signal Cs and the no-bias timing signal Cb is inactive, which means that the image data Di is selected. In the brake voltage applied period Ts, the stop timing signal is active, with the result that the brake voltage data Dsi is selected. Besides, in the no-bias period, the no-bias timing signal Cb is active, with the result that the common voltage data Dcom.

The selected data in this way is supplied to the D/A converter 145 in FIG. 23 and outputted to each data line 101 as the data line signal from X1 to Xn.

(C-3) Operation of Electrophoretic Device

The operation of an electrophoretic display in this embodiment is similar to that of the first embodiment described referring to FIG. 8, in a point of its sequence that starts with resetting, followed by writing, holding, and ends with rewriting. However, it differs in having the process in which the brake voltage is applied to the pixel electrodes 104 in writing (contains rewriting). In the following, the difference, that is, details of the writing operation will be described.

Figure 26:
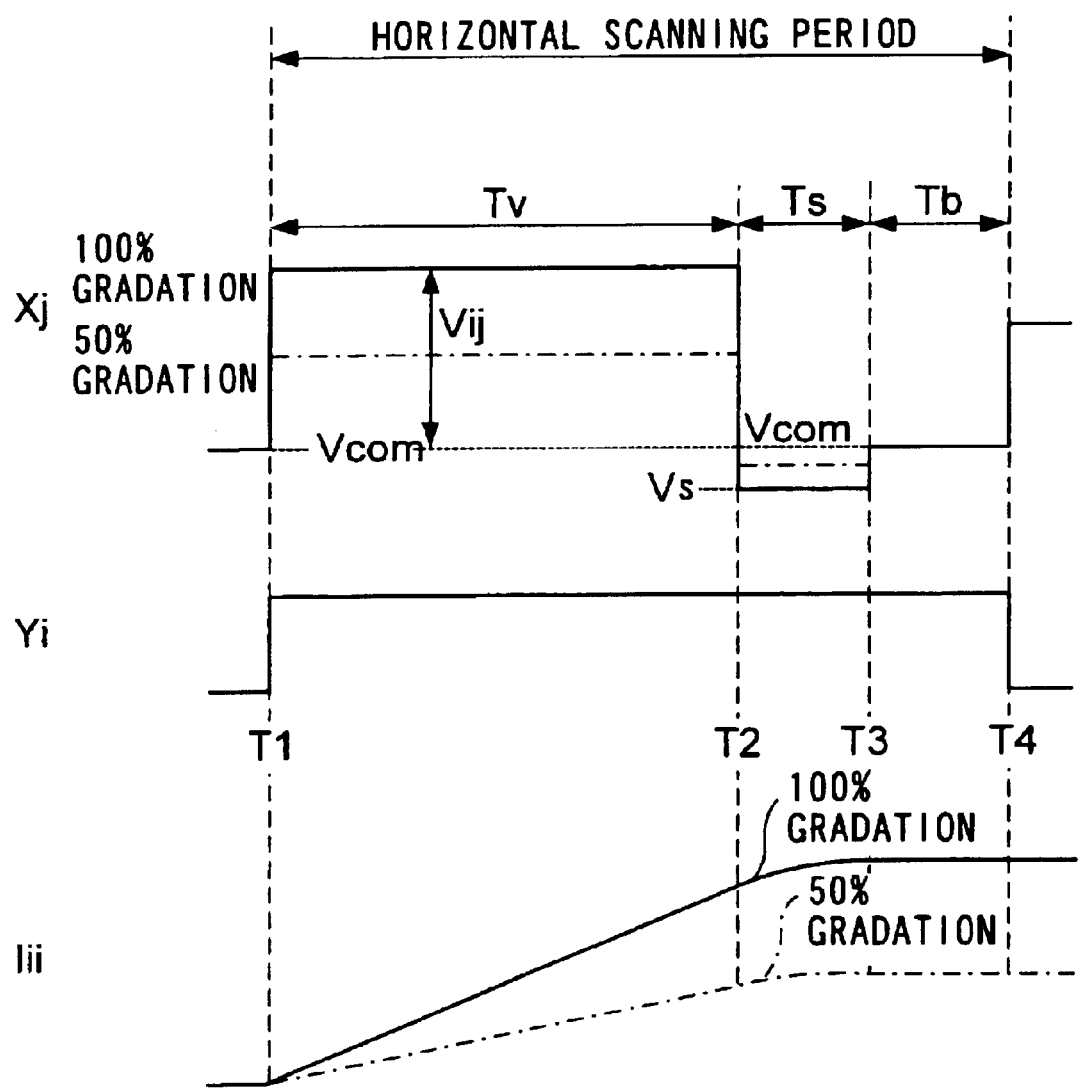
FIG. 26 is a timing chart of the electrophoretic display in the writing operation.

FIG. 26 shows a timing chart of the electrophoretic device in the writing operation. Here is depicted about ith line and jth column but it is obvious that other pixels can be, of course, dealt likewise. In the next previous field, the pixel Pij has displayed the gradation 100%. The voltage of the data line signal, which is supplied to the jth data line 102, equals to the gradation voltage Vij during the gradation voltage applied period Tv which starts with T1 and ends with T2 as shown in FIG. 26. In the period of the brake voltage applied period Ts from T2 to T3, it equals to the brake voltage Vs, and in the no-bias period Tb from T3 to T4 it equals to the common voltage Vcom.

The scanning line signal Yi which is supplied to the ith scanning line 101 is active in the ith scanning line period. Hence the TFT 103 which comprises the pixel Pij is turned on in this period, so that the pixel electrode 104 imports the data signal Xj of from T1 to T4. Namely, in this example, the operation which starts with applying the gradation voltage Vij and ends with applying voltage of the common voltage Vcom between the two electrodes is completed.

In the following, the pigment praticles' motions will be described in the pixel Pij. Having been done the reset operation before the writing operation begins, at time T1, all pigment praticles of the pixel Pij are positioned on the side of the pixel electrode 104. At this time when the voltage 104 Vij is applied to the pixel electrode 104, an electric field is generated which is in the direction of from the common electrode 201 from to the pixel electrode 104. Thus pigment praticles 3 start to migrate at time T1 and the brightness Iij is being gradually high.

At time t2, the brake voltage Vs is applied to the pixel electrodes 104. The value of the brake voltage Vs is set based on the gradation voltage Vij which has been applied in the immediately previous period and has negative-polarity with respect to the common voltage Vcom. That is because the electric field to counteract Coulomb force must be applied, which was applied to the pigment praticles 3 in the direction of from the pixel electrodes 104 to the common electrode.

This brake voltage Vs, as it were, acts as a brake upon the particles 3 to give them Coulomb force whose direction is opposite with respect to their motions. With this operation the particles 3 stop moving until time T3 which is the end of the voltage applied period Ts.

At time T3, the common voltage is applied to the pixel electrodes 104. The voltage of the pixel electrodes 104 coincides with that of the common electrode 201 to take away the charge accumulated in the electrodes. By doing so, any electric field isn't generated any longer and thus the positions of the pigment praticles 3 can be held.

In the writing operation of this embodiment, firstly the pigment praticles 3 migrate by applying the gradation voltage Vij, then the particles 3 brake to stop by applying the brake voltage Vs. Therefore even if the viscous drag of the dispersion medium 2 is small, a distance which the pigment praticles 3 migrate until the particles 3 stop due to their inertia can be short. This enables to display stable images in a short time without fluctuation of brightness.

(D) Fourth Embodiment

In the third embodiment, the gradation voltage is applied. It is also possible to apply the differential voltage.

Figure 27:
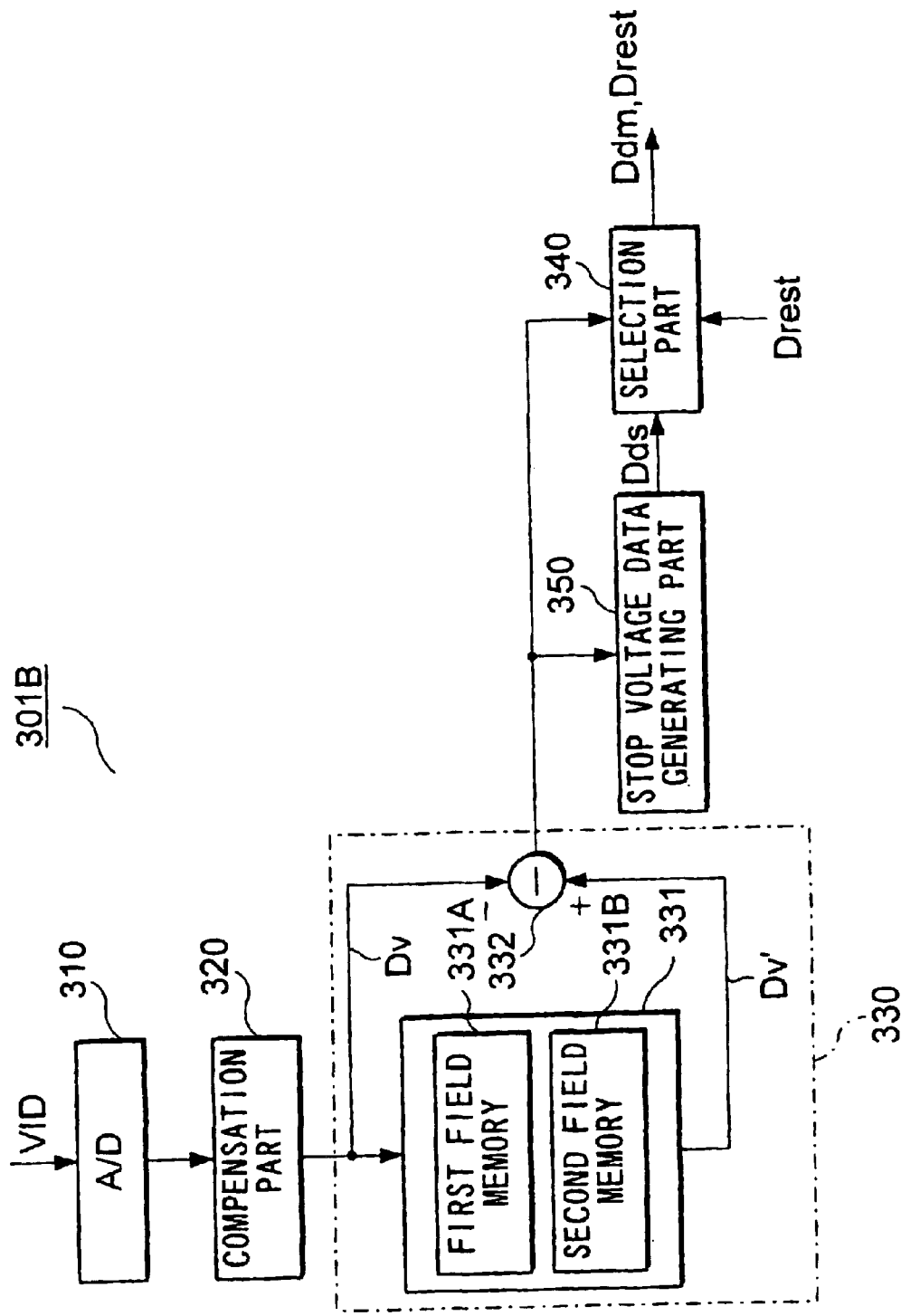
FIG. 27 is a block diagram of the image signal processing circuit 300B' based on the forth embodiment.

FIG. 27 shows a block diagram of the image signal processing circuit 301B.

A brake voltage generation part 350 has a table in which the brake voltage data Ds' and a differential image data Dd whose values are correspondent to those of Ds' are memorized. This means that the brake voltage data Dds is to be acquired by accessing the table and pointing to the differential image data Dd as the address. The table is configured with storage circuits such as RAMs and ROMs.

The brake voltage data Dds corresponds to the brake voltage Vds, which will be described later, and is used for braking the pigment particle 3. As mentioned above, particles 3 continue moving due to their inertia even if the electric field is not applied to dispersal system 1 any longer. But force moving in the opposite direction enables braking and stopping particles 3. Since the pigment particles 3 are moving according to the gradation voltage when the image is going to displayed, it is necessary to apply an electric field whose direction is opposite and, furthermore, whose intensity is dependent on the kinetic energy of particles 3, in other words, the differential voltage Vd. Therefore, in this embodiment, taking the fluid resistance of the dispersion medium 2 and some other effects into consideration, the brake voltage data Dds corresponding to the values of the differential image data Dd is memorized in the table beforehand and is to be read the table as required.

The data line drive circuit and the selection circuit are similar to those of the second embodiment, therefore explanation is omitted here.

(D-1) Operation of the Electrophoretic Device

Figure 28:
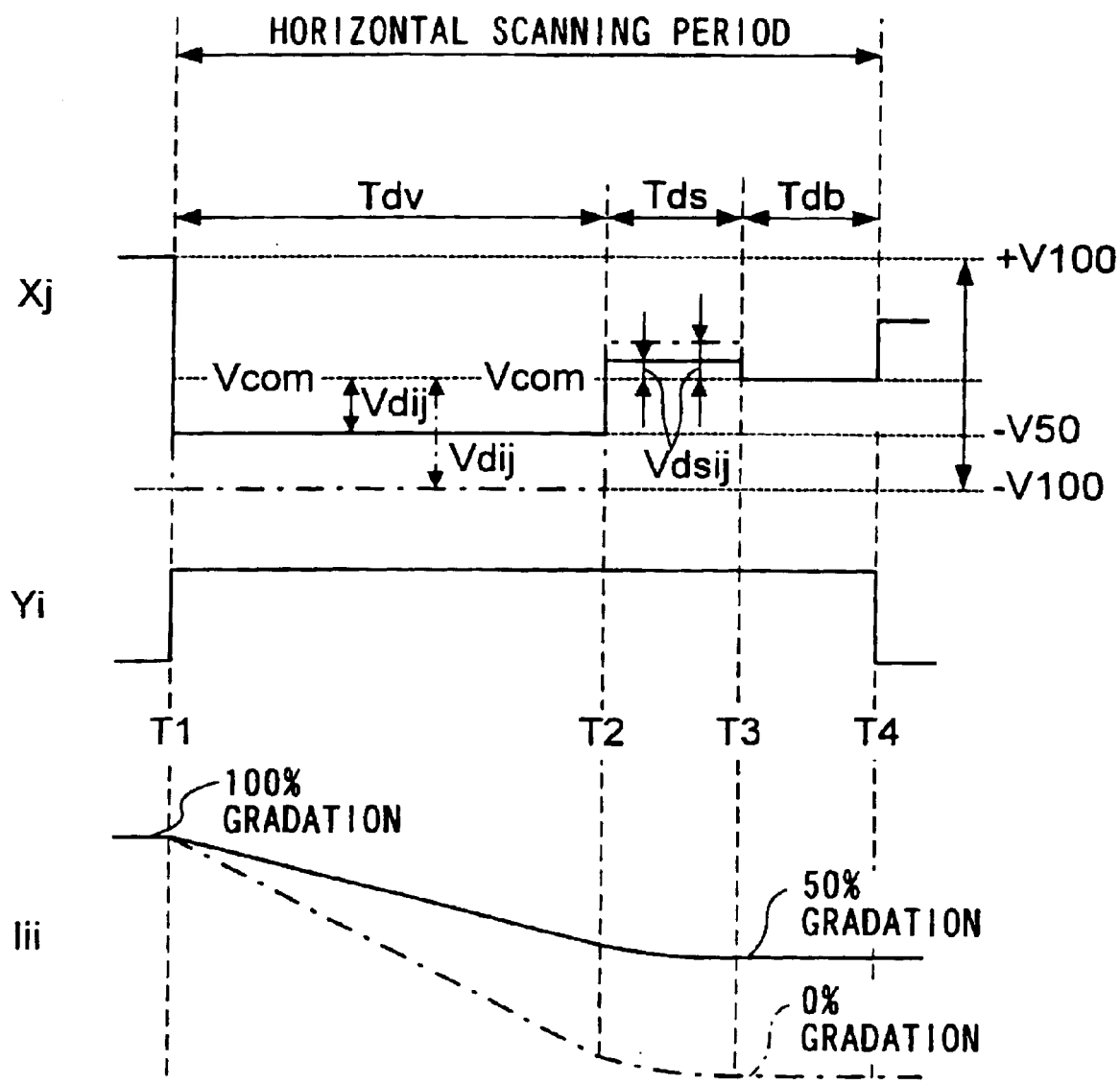
FIG. 28 is a timing chart of the electrophoretic display in the writing operation in the second embodiment.

FIG. 28 shows a timing chart of the electrophoretic display in the writing operation. An ith line (ith scanning line) and a jth column (jth data line) are depicted but it is obvious that other pixels can bedealt with similarly. In the following, the pixel of the ith line and the jth column is represented by Pij, the differential voltage to be displayed in the pixel Pij is represented by Vdij and the brightness of Pij is represented by Iij. Suppose the gradation in Pij was 10% in the next previous period.

A voltage of the jth line signal Xj, which is supplied to the jth data line 102, as shown in FIG. 28, is equal to the differential voltage Vdij in the differential voltage applied period Tdv from time T1 to time T2. Provided that the gradation to be displayed in the present field is 50%, the value of the differential voltage Vdij is −V50 indicated as the solid line therein, because the voltage decreases by 50% from the previous one. By another way of example, if the gradation to be displayed in the present field is 0%, the value of the Vdij is −V100 indicated as the dotted line therein. In the brake voltage applied period Ts from time T2 to time T3, the voltage of the data line signal Xj is equals to the brake voltage Vdsij. The value of the brake voltage Vdsij corresponds to that of Vdij. In the no-bias period from time T3 to time T4, the voltage of the data line signal is equal to the common voltage Vcom.

(E) Fifth Embodiment (E-1) Display

In the electrophoretic device of the first embodiment, the gradation voltage applied period Tv and no-bias period Tb are set in the period of one horizontal scanning. Motions of the pigment particles finish within the period.

Instead, in the electrophoretic devices of the fifth embodiment, a gradation voltage applied period and a no-bias period are set on a field-to field basis. A configuration of this electrophoretic device is similar to that of the first embodiment as shown in FIG. 3, except for the period in which the no-bias signal timing Cb is active.

(E-2) Whole Operation

Figure 29:
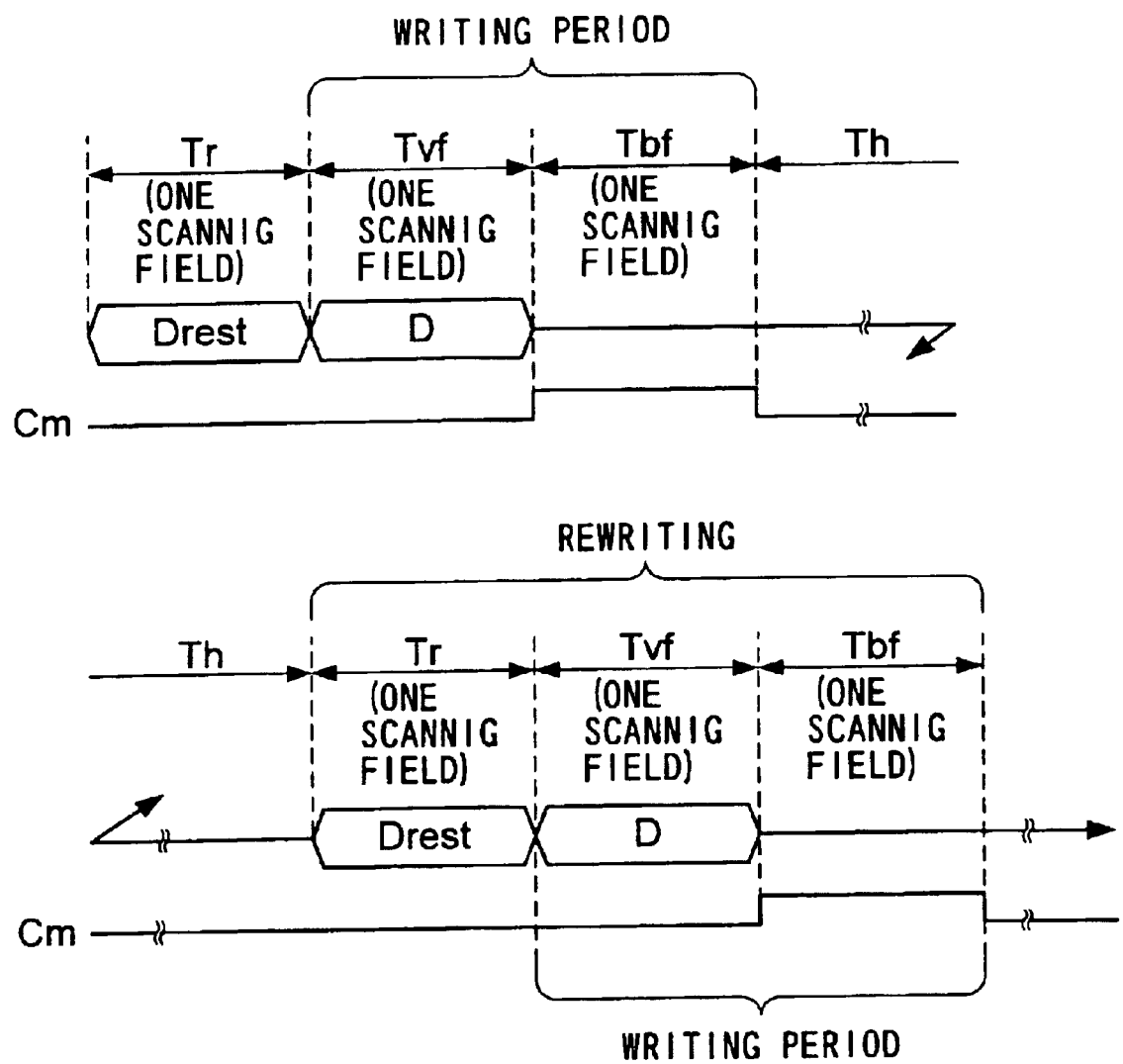
FIG. 29 is a timing chart of the electrophoretic display based on the fifth embodiment.

FIG. 29 shows a timing chart of the whole operation in the electrophoretic display. As shown therein, the image signal processing circuit 300A outputs the reset data Drest in the reset period Tr. In this period, pigment particles 3 are attracted to pixel electrodes 104 so that their positions are initialized.

Next, a writing period is composed, of the gradation voltage applied period Tvf and the no-bias period Tbf on a field-to-field basis. In the gradation voltage applied period Tvf, the gradation voltage is applied to pixel electrodes 104 based upon outputted image data D outputted from image signal processing circuit 300A. But the no-bias signal Cb remains inactive in that period hence the common voltage Vcom is not applied to pixel electrodes 104.

While in the no-bias period Tbf, the image signal processing circuit 300A does not supply any data but the no-bias timing signal Cb becomes active, so that the common voltage Vcom is applied to all data lines 102.

Therefore, the common voltage Vcom is applied to each of pixel electrodes 104. That is, in this embodiment, the gradation voltage D is applied in a certain period of a certain scanning line, then gradation voltage V is maintained until the scanning line is again selected, then the common voltage Vcom is applied to pixel electrodes 104 in the next period in which the scanning line is selected.

In the holding period Th, there is no electric field between the pixel electrodes 104 and the common electrode 201, thus enabling holding the image displayed in the previous writing period.

In the rewriting period, as in the displaying of the first period, a series of the processing which entails resetting, applying the gradations voltage, applying the common voltage (no-bias), and so on is carried out.

(E-3) Writing Operation

Figure 30:
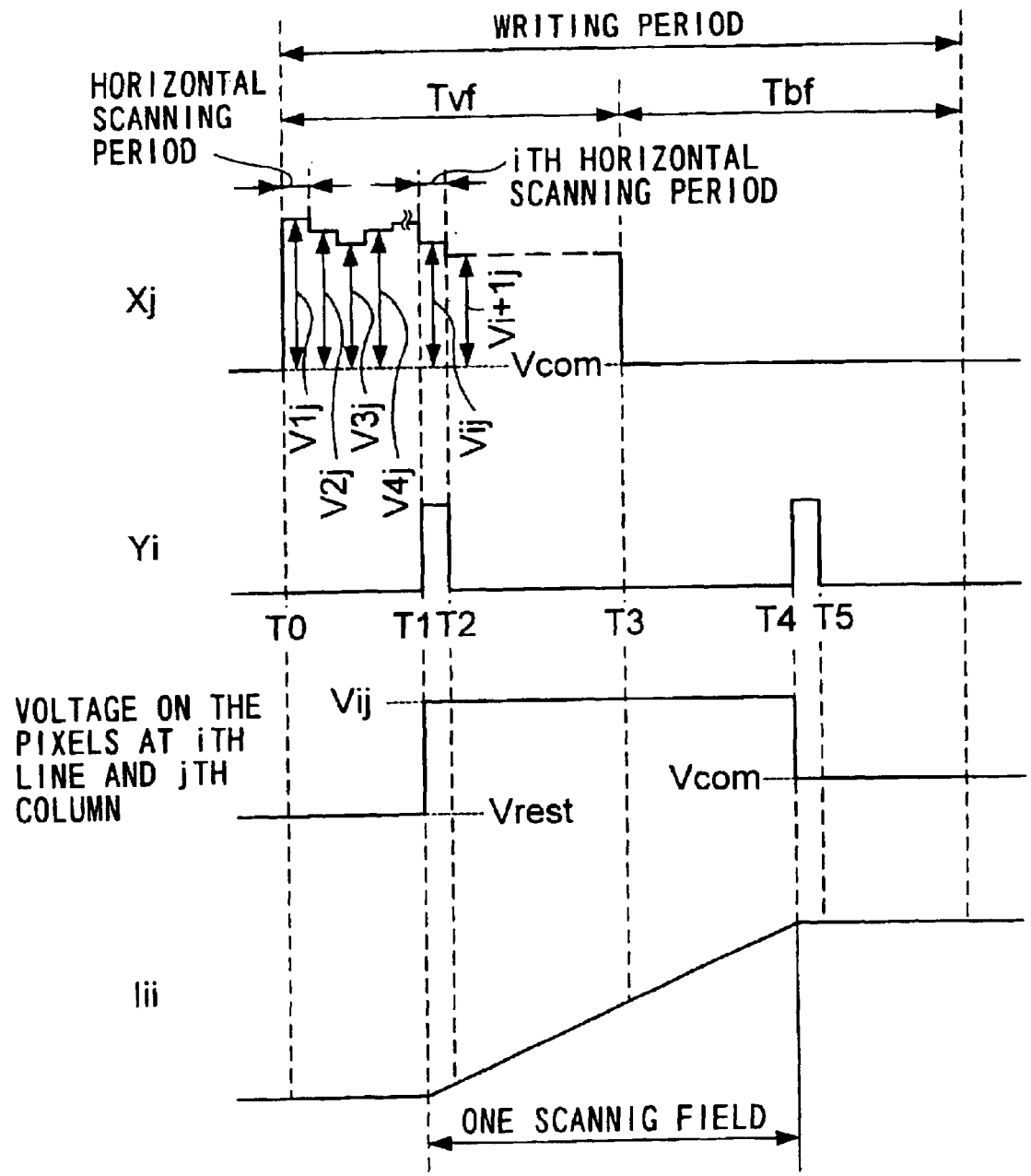
FIG. 30 is a timing chart of the electrophoretic display in the writing operation.

FIG. 30 is a timing chart of the electrophoretic display in the writing operation. Pij which is on ith line and jth column is depicted, but it is obvious that other pixels can be described similarly. The voltage of the data line signal Xj which is supplied to the jth data line 102 varies by the scanning line period in the gradation voltage applied period Tvf as shown in FIG. 30. In the period of the ith scanning line, the data line signal Xj is equal to the gradation voltage Vij. At this time, since the scanning line signal Yi becomes active (the H-level), the gradation voltage Vij is applied to pixel electrode 104, thereby, at time T1, shifting the voltage of pixel electrode 104 from the reset voltage Vrest to the gradation voltage Vij so that the electric field corresponding to the gradation to be displayed is applied to the dispersal system 1.

At time T2, when the scanning line signal Yi becomes inactive (the L-level), the TFT 103 of the pixel Pij shifts to OFF. However since some charge is accumulated in the capacitor, the voltage of the pixel electrode 104 remains the gradation voltage Vij.

In the period of the ith horizontal scanning in the no-bias period Thf, when the scanning signal Yi becomes active, the common voltage Vcom is applied to pixel electrode 104. Therefore the voltage of pixel electrode 104 coincides with the common voltage Vcom at time T4.

(E-4) Motions of the Pigment Particles

Having completed the resetting operation before starting the writing operation, at time T0, the pigment particles 3 are all positioned on the side of pixels 104. At time T1, when the gradation voltage Vij is applied to pixel electrodes 104, an electric field is applied in a direction from pixel electrodes 104 to the common electrode 201. Hence the pigment particles 3 start to move, increasing the brightness Iij.

The electric field corresponding to the gradation voltage Vij is applied over one scanning field from time T1 to time T4. Hence, during this period, the pigment particles 3 continue moving to pixel electrodes 104. Namely, in the first embodiment, the gradation voltage Vij is applied in a certain period within one horizontal scanning, while in the fifth embodiment the gradation voltage is applied over a period of one scanning field. The amount of motion of the pigment particles 3 is, as explained above, dependent on the electric field applied to the dispersal system and the duration thereof. In this embodiment, since the electric field is applied over one scanning field for a long time, even a weak electric field can attain the brightness Iij desired. Therefore it is possible to drive the data lines signal from X1 to Xn using low voltage based upon this embodiment.

(F) Sixth Embodiment

In this embodiment, it is possible to apply differential voltages to obtain desired gradations of an image displayed.

Figure 31:
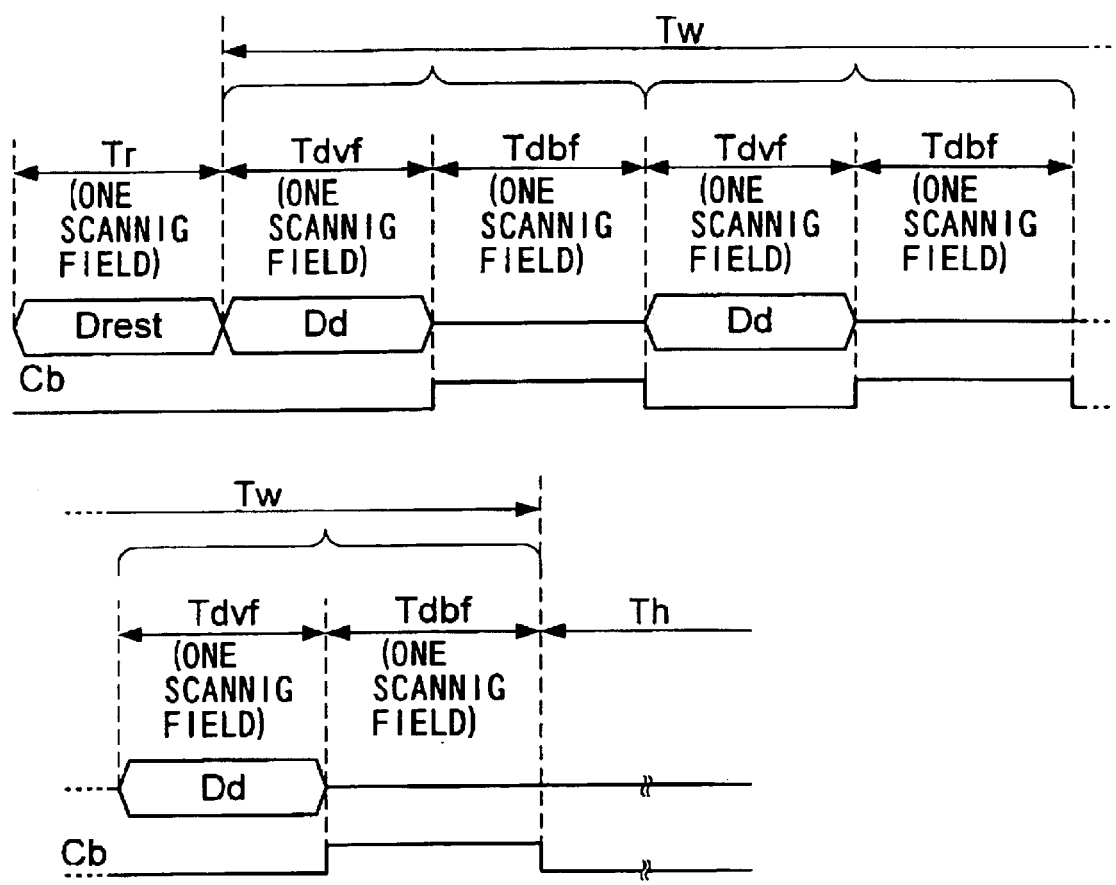
FIG. 31 is a timing chart showing a whole operation of the electrophoretic display based on the sixth embodiment.

FIG. 31 is a timing chart showing the entire operation utilized in operating the electrophoretic display. As shown therin, the image signal processing circuit 301A outputs the reset data Drest in the reset period Tr. In this period the pigment particles 3 are attracted to the pixel electrodes 104 to enable their positions to be initialized.

The writing period Tw comprises a plurality of unit periods, consisting of a pair of applied period differential voltages Tdvf and no-bias period Tdbf. In gradation voltage applied period Tdvf, the gradation voltage is applied to the pixel electrodes 104 based on the image data D outputted from the image signal processing circuit 300A. The no-bias signal Cb remains inactive in this period and therefore the common voltage Vcom is not applied to the pixel electrodes 104.

However, in the no-bias period Tdbf, the image signal processing circuit 300A supplies no data but the no-bias timing signal Cb becomes active, whereby the common voltage Vcom is applied to all of data lines 102.

As a result, the common voltage Vcom is applied to each of pixel electrodes 104. That is, in this embodiment, the gradation voltage D is applied within a particular scanning line period, and the differential voltage Vd is maintained until a scanned line is again selected. After this, a common voltage Vcom is applied to the pixel electrodes 104 in a period in which the scanning line is selected next.

In the holding period Th, there is no electrostatic field between the pixel electrodes 104 and the common electrode 201, which enables to hold the image displayed in the next previous writing period.

(F-2) Writing Operation

Figure 32:
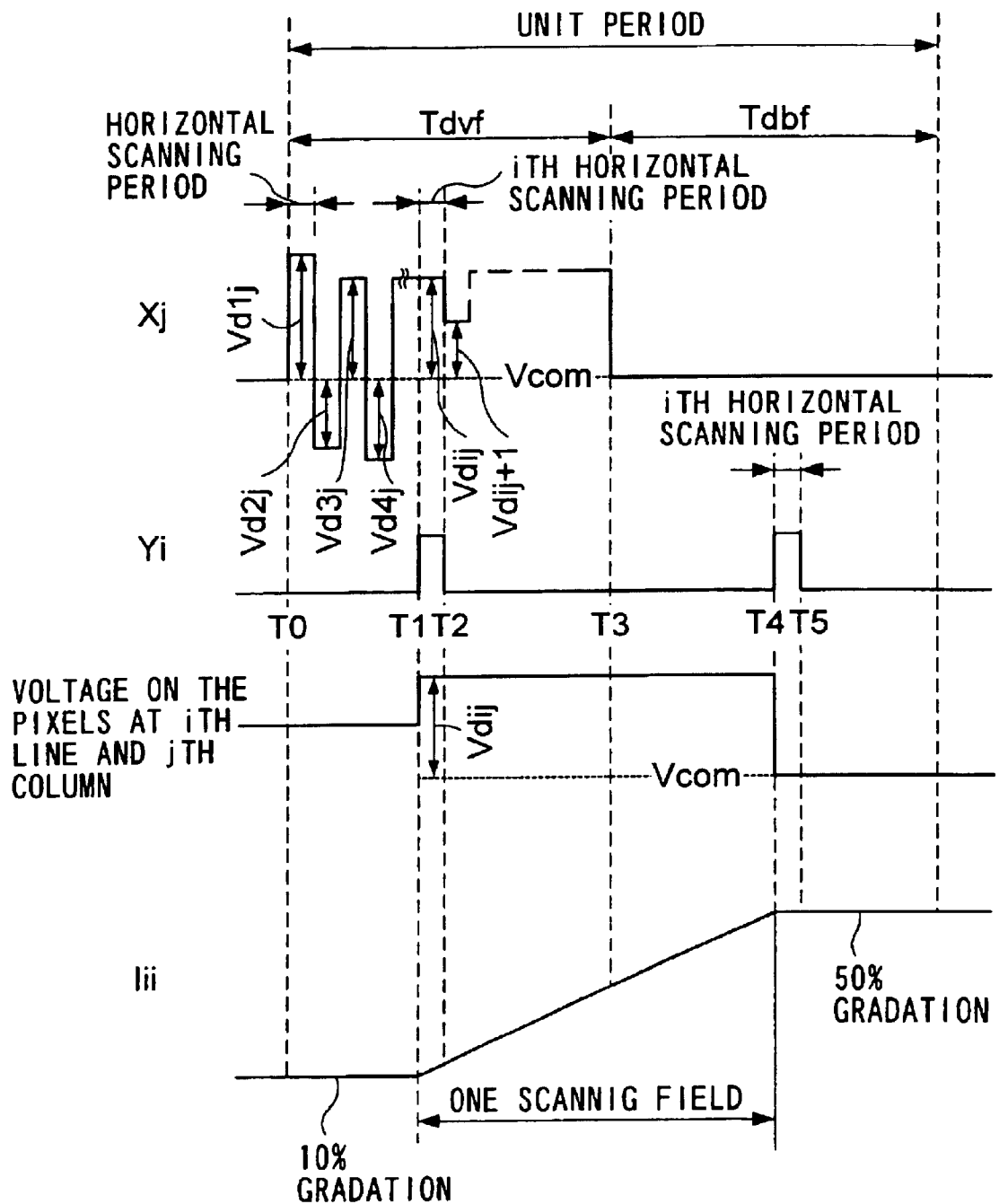
FIG. 32 is a timing chart of the electrophoretic display in the writing operation based on the sixth embodiment.

FIG. 32 is a timing chart of the electrophoretic display showing a writing operation. Depicted is Pij, located on an ith line and jth column, but it is will be apparent to those skilled in the art that other pixels can be described likewise. Provided that the gradation of the pixel Pij in the previous unit period is 10% and that in the present unit period is 50%.

The voltage of the data line signal Xj which is supplied to the jth data line 102 varies as a result of the scanning line period in the differential voltage applied period Tdvf as shown in FIG. 32. In the period of the ith scanning line, the data line signal Xj is equal to the differential voltage Vdij. At this time, since the scanning line signal Yi becomes active (the H-level) the differential voltage Vdij is applied to the pixel electrode 104. Thereby, at time T1, the voltage of the pixel electrode 104 shifts from the reset voltage Vrest to the differential voltage Vdij, with the result that the electrostatic field corresponding to the display gradation to be displayed is applied to the dispersal system 1.

At time T2, when the scanning line signal Yi becomes inactive (the L-level), the TFT 103 of the pixel Pij shifts to OFF. However, since some charge is accumulated in the capacitor, the voltage of the pixel electrode 104 remains subject to differential voltages Vdij.

In the period of the ith horizontal scanning in the no-bias period Tdbf, when the scanning signal Yi becomes active, the common voltage Vcom is applied to the pixel electrode 104. Therefore the voltage of the pixel electrode 104 coincides with a common voltage Vcom at time T4.

(G) Seventh Embodiment

(G-1) Display

In the electrophoretic device described in the second embodiment, the gradation voltage applied period Tv, the brake voltage applied period Ts, and the no-bias period Tb are set to constitute a period of one horizontal scanning to migrate and brake the pigment particles 3.

Differently, in the seventh embodiment, a gradation voltage applied period Tvf, the voltage applied period Tsf, and the no-bias period are set on a field-to-field basis.

The configuration of this electrophoretic device is similar to that of the third embodiment as shown in FIG. 3, except for the period in which the no-bias signal timing Cb is active.

(G-2) Whole Operation

Figure 33:
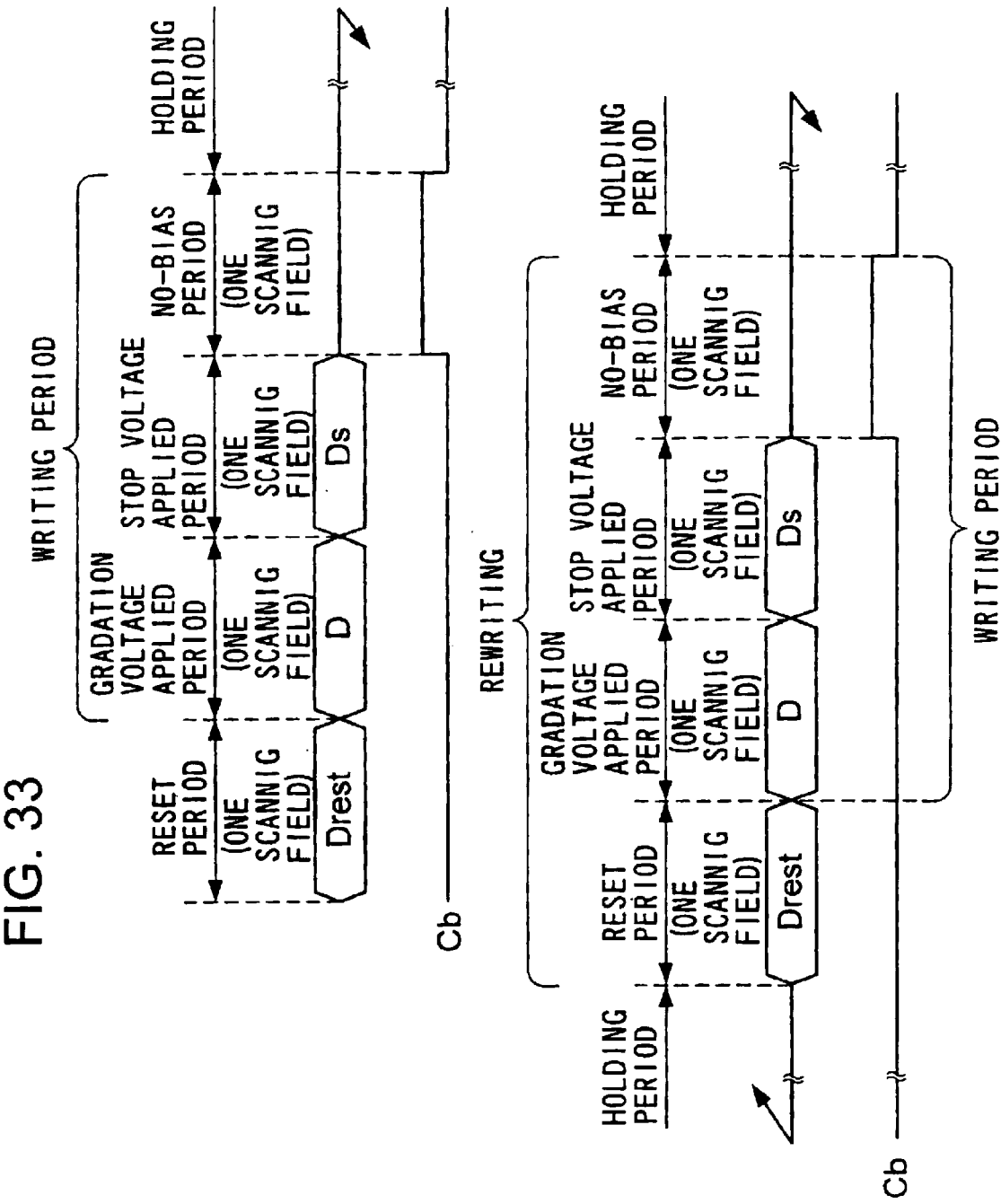
FIG. 33 is a timing chart of the whole operation pf the electrophoretic display based on the seventh embodiment.

FIG. 33 shows a timing chart of the whole operation in the electrophoretic display. As shown therein, the image signal processing circuit 301A output the reset data Drest in the reset period Tr. In this period the pigment particles 3 are attracted to the pixel electrodes 104 and their positions are initialized.

The writing period is composed, on a field-to-field basis, of the gradation voltage applied period Tvf, the brake voltage applied period Tsf and the no-bias period Tbf. In the gradation voltage applied period Tvf and the brake voltage applied period, the gradation voltage V and the brake voltage Vs are applied to the pixel electrodes 104 based on the outputted image data D and the brake voltage data Ds outputted from the image signal processing circuit 301A. However, since no-bias signal Cb remains inactive in this period, the common voltage Vcom is not applied to pixel electrodes 104.

While in the no-bias period Tbf, the image signal processing circuit 300A supplies no data, the no-bias timing signal Cb becomes active, whereby the common voltage Vcom is applied to all data lines 102. Therefore common voltage Vcom is applied to each of pixel electrodes 104.

That is, in this embodiment, the gradation voltage V is applied within a certain period during which line scanning is performed, and subsequently a gradation voltage V is maintained until the scanning line is again selected; after which brake voltage Vs is applied to pixel electrodes 104. Subsequently, brake voltage V is maintained until the scanning line is again selected again, after which common voltage Vcom is applied to pixel electrodes 104 in a period during which the scanning line is selected next.

In the holding period Th, no electrostatic field exists between the pixel electrodes 104 and the common electrode 201, thereby enabling an image displayed to be held until the next writing period commences.

In the rewriting period, as in displaying of the first period, the series of the processing which contains resetting, applying a gradation voltage, applying a brake voltage, applying a common voltage (no-bias), and so on is carried out.

(G-3) Writing Operation

Figure 34:
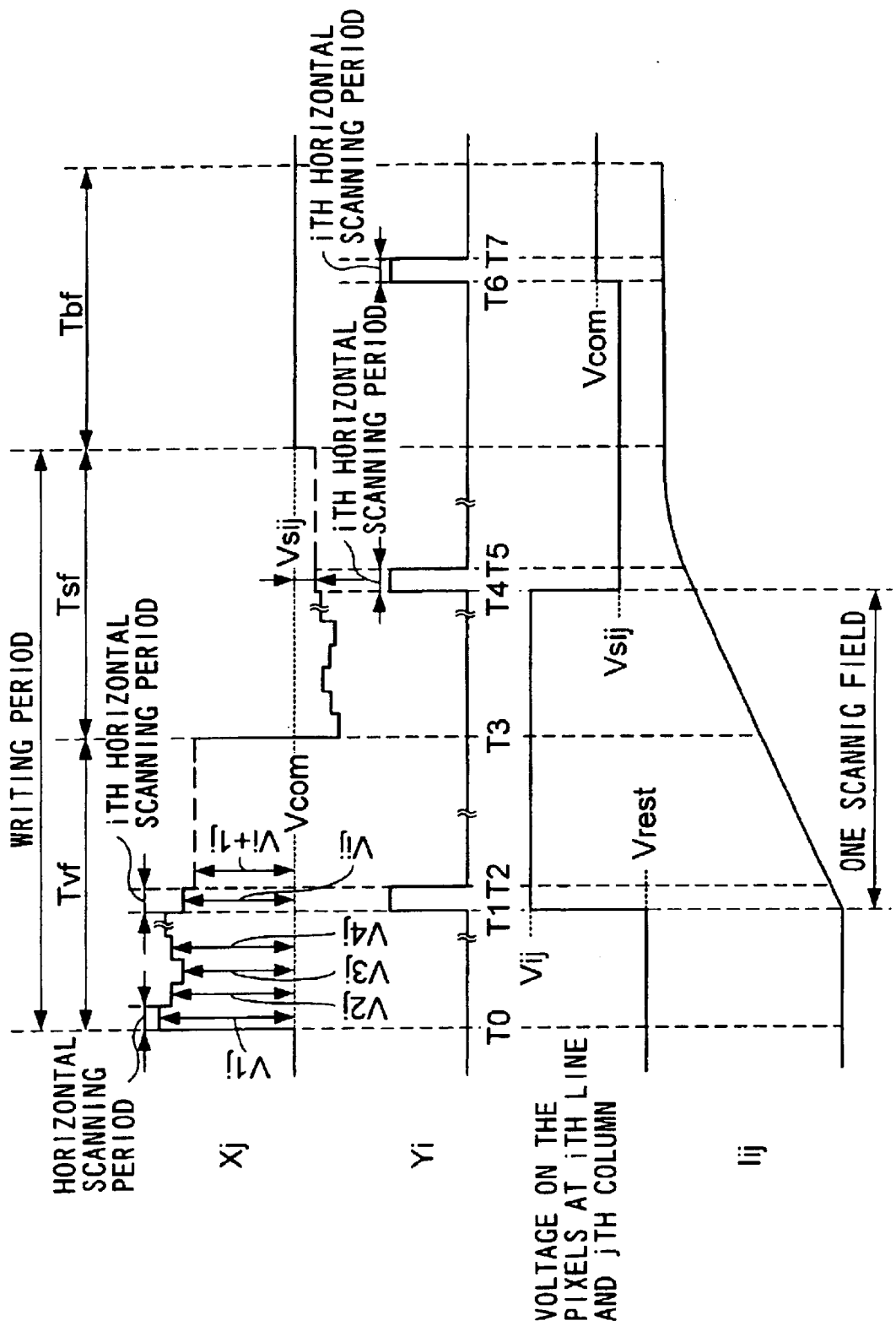
FIG. 34 is a timing chart of the electrophoretic display in the writing operation.

FIG. 34 is timing chart of the electrophoretic display in a writing operation. Here will be described Pij which is on ith line and jth column, but it will be apparent that other pixels can be described likewise. The voltage of the data line signal Xj which is supplied to the jth dsta line 102 varies within the scanning line period of the gradation voltage applied period Tvf as shown in FIG. 34. In the period of the ith scanning line, the data line signal Xj is equal to the gradation voltage Vij. At this time, since the scanning line signal Yi becomes active (the H-level) the gradation voltage Vij is applied to the pixel electrode 104. Thereby, at time T1, the voltage of the pixel electrode 104 shifts from a reset voltage Vrest to a gradation voltage Vij so that the electrostatic field according to the gradation to be displayed is applied to the dispersal system 1.

At time T2, when the scanning line signal Yi becomes inactive (the L-level), the TFT 103 of the pixel Pij shifts to OFF. However since some charge is accumulated in the capacitor, the voltage of the pixel electrode 104 remains the gradation voltages Vij. See previous.

In the period of the ith horizontal scanning of the brake voltage applied period Tsf, when the scanning signal Yi becomes active, the brake voltage Vsij according to the gradation voltage Vij is applied to the pixel electrode 104. Hence the voltage of the pixel electrode 104 is equal to that of the brake voltage.

In another period of the ith horizontal scanning in the no-bias period Tbf, when the scanning signal Yi becomes active, the common voltage Vcom is applied to the pixel electrode 104. Therefore the voltage of the pixel electrode 104 coincides with the common voltage Vcom at time T4.

(G-4) Motions of Pigment Particles

Having completed the resetting operation before the writing operation starts, at time T0, the pigment particles 3 are positioned at the side of the pixels 104. At time T1, when the gradation voltage Vij is applied to the pixel electrodes 104, an electrostatic field is applied in the direction of from the pixel electrodes 104 to the common electrode 201. Hence the pigment particles 3 start to migrate, increasing brightness Iij.

In one horizontal scanning period of from T4 to T6, the brake voltage Vsij is applied between the two electrodes. Since the brake voltage Vsij is negative relative to the common voltage Vcom, Coulomb force act in the direction of from the common electrode 201 to the pixel electrode 104, which is opposite to that of motions of the particles 3. This causes the particles 3 to lose velocity and become stationary by time T6. Additionally, in a period of from time T6 to time T7, a common voltage Vcom is applied to the pixel electrodes 104, thereby removing a charge accumulated between the electrodes. As a result, after time T7, ino electrostatic field is applied by even though TFT 103 is turned OFF. Consequently, the positions of the pigment particles 3 are set.

In the third embodiment, the gradation voltage Vij, the brake voltage Vs, and the common voltage Vcom are applied within a defined period constituting one horizontal scanning; while in the seventh embodiment the gradation voltage Vij and the brake voltage Vsij are applied over a single scanning field period. In this embodiment, since the electrostatic field is applied over the entire period of a scanning field period, even a weak electrostatic field can attain a brightness Iij desired. Consequently, in this embodiment it is possible to drive the data lines signal from X1 to Xn, using a low voltage.

(H) Eighth Embodiment

In the seventh embodiment, the gradation voltage is applied. However, it is also possible to apply a differential voltage.

(H-1) Operation

Figure 35:
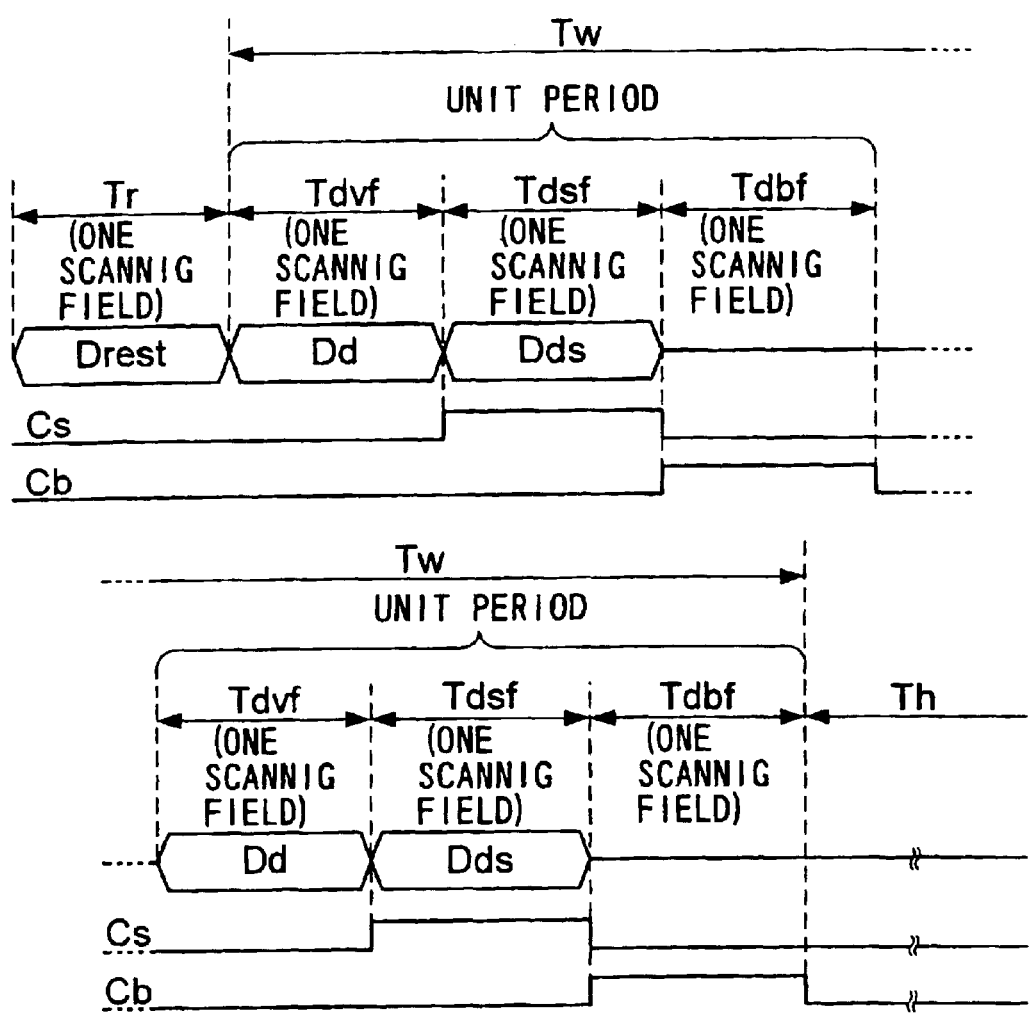
FIG. 35 is a timing chart showing whole operation of the electrophoretic display based on the eighth embodiment.

FIG. 35 is a timing chart of the whole operation in the electrophoretic display. As shown, the image signal processing circuit 301B outputs the reset data Drest in the reset period Tr. In this period, the pigment particles 3 are attracted to the pixel electrodes 104 and their positions are initialized.

The writing period is composed, on a field-to-field basis, of the gradation voltage applied period Tdvf, the brake voltage applied period Tdsf and the no-bias period Tdbf. In the differential voltage applied period Tdvf and the brake voltage applied period, the differential voltage Vd and brake voltage Vds are applied to the pixel electrodes 104 based upon the outputted image data D and the brake voltage data Ds outputted from the image signal processing circuit 301B. But the no-bias signal Cb remains inactive in that period hence the common voltage Vcom is not applied to the pixel electrodes 104.

While in the no-bias period Tdbf, the image signal processing circuit 300A does not supply any data but the no-bias timing signal Cb becomes active, so that the common voltage Vcom is applied to all the data lines 102.

Therefore the common voltage Vcom is applied to each of the pixel electrodes 104. That is, in this embodiment, the differential voltage Vd is applied in a preset period in which a particular scanning line is selected, with the differential voltage Vd being maintained during a next and different period in which the scanning line is again selected, after which the brake voltage Vds is applied to the pixel electrodes 104 during a subsequent and different period in which the scanning line is again selected, the brake voltage Vds then being maintained until the scanning line is once more selected in a next and different period, after which the common voltage Vcom is then applied to the pixel electrodes 104 in a next and different period in which the scanning line is once again selected. In the holding period Th, no electrostatic field exists between the pixel electrodes 104 and the common electrode 201, and thus image displayed in either a next or previous writing period can be held.

In the rewriting period, as in a first time display, processing which is carried out consists of applying a reset voltage, applying a gradient voltage, applying a brake voltage, and applying a common voltage (no-bias).

(G-3) Writing Operation

Figure 36:
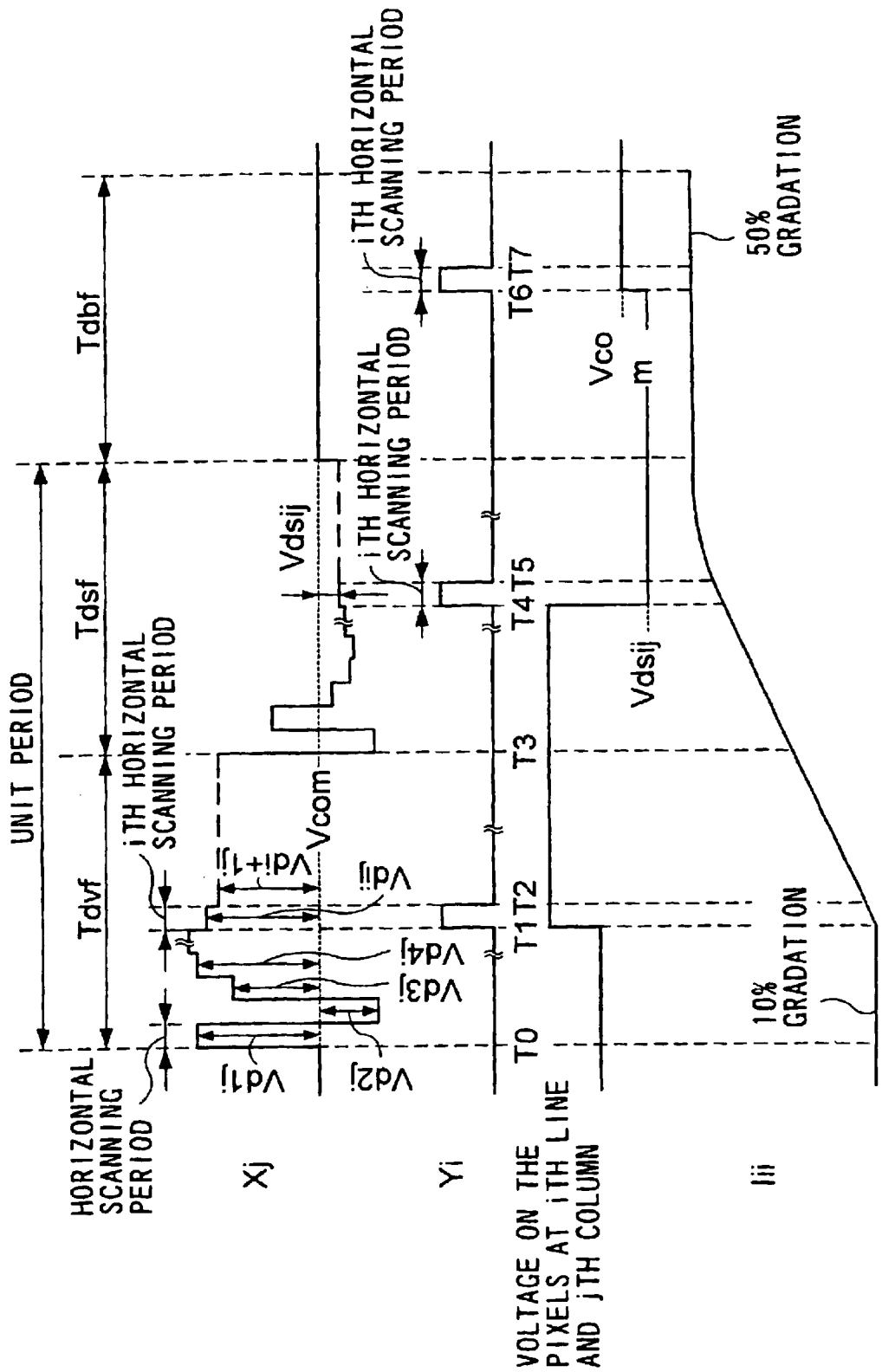
FIG. 36 is a timing chart of the electrophoretic display in the writing operation based on the eighth embodiment.
Figure 37:
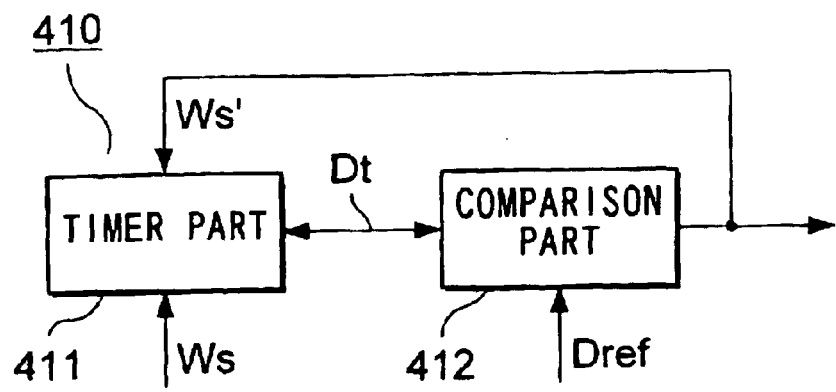
FIG. 37 is a block diagram of a timer apparatus.

FIG. 36 is timing chart of the electrophoretic display in the writing operation. Here will be depicted about the pixel Pij which is on ith line and jth column, but it is obvious that other pixels can be described likewise. Suppose a gradation of the pixel Pij in the next previous unit period is 10% and that in the present unit period is 50%, for instance.

The voltage of the data line signal Xj, which is supplied to the jth data line 102, equals to the differential voltage Vdij in the ith horizontal scanning in the differential voltage applied period Tdvf as shown in FIG. 36. At this time, since the scanning line signal Yi becomes active (the H-level), the differential voltage Vdij is applied to the pixel electrode 104. Thereby, at time T1, the voltage of the pixel electrode 104 shifts from the reset voltage Vrest to the differential voltage Vdij so that the electrostatic field according to the gradation to be displayed is applied to the dispersal system 1.

At time T2, when the scanning line signal Yi becomes inactive (the L-level), the TFT 103 of the pixel Pij shifts to OFF. However, since some charge is accumulated in the capacitor, the voltage of the pixel electrode 104 remains in the form of the differential voltages Vdij.

In the period of the ith horizontal scanning of the brake voltage applied period Tdsf, when the scanning signal Yi becomes active, the brake voltage Vdsij according to the differential voltage Vdij is applied to the pixel electrode 104. Hence the voltage of the pixel electrode 104 is equal to that of the brake voltage.

In another period of the ith horizontal scanning in the no-bias period Tdbf, when the scanning signal Yi becomes active, the common voltage Vcom is applied to the pixel electrode 104. Therefore the voltage of the pixel electrode 104 coincides with the common voltage Vcom at time T4.

(I) Applications

So far, several embodiments have been described, However, it is to be understood by those skilled in the art that this invention is not restricted in these embodiments, and various applications and variations are possible.

Following are some variations.

(I-1) Displaying of Animation

In the above embodiments, the process of displaying an image consists of first resetting then writing, subsequently holding, and then rewriting if necessary.

As a result, the electrophoretic displays in those embodiments are suitable for displaying a static image. However it is possible to display an animation by making the reset period Tr as well as by repeating rewriting periodically. In displaying an animation, it is preferable that the velocity of the pigment particles 3 should be high. This means that small fluid resistance is more suitable. In such a situation, the pigment particles 3 are likely to continue to move due to their inertia after removal of the electrostatic field. Therefore it is preferable to brake the particles 3 by applying the brake voltage as described above.

(I-2) Refreshing

It is preferable that the specific gravity of the dielectric fluid 2 and that of the pigment particles 3 which comprise the dispersal system 1 be equal. However, it is difficult to achieve complete parity of the respective specific gravities, due to restrictions of materials employed and variations therein. In such a case, when the dispersal system 1 is left in stasis for a long time once an image is displayed, the pigment particles 3 sink down or float up due to gravitational effect. In order to overcome this problem, it is preferable for a timer apparatus to be set in the timing generator 400 to rewrite the same image for a certain period. The timer apparatus 410 has a timer part 411 and a comparison part 412. The timer generates duration data Dt measuring time, in which the value of the duration data Dt is reset to '0' when either a writing start signal Ws which designates an ordinary writing, or a rewriting signal Ws' becomes active. The comparison part 412 compares the duration data Dt with the predetermined reference time data Dref which designates the refresh period and, if they coincide, generates the rewriting signal Ws' which is active during a preset period.

Figure 38:
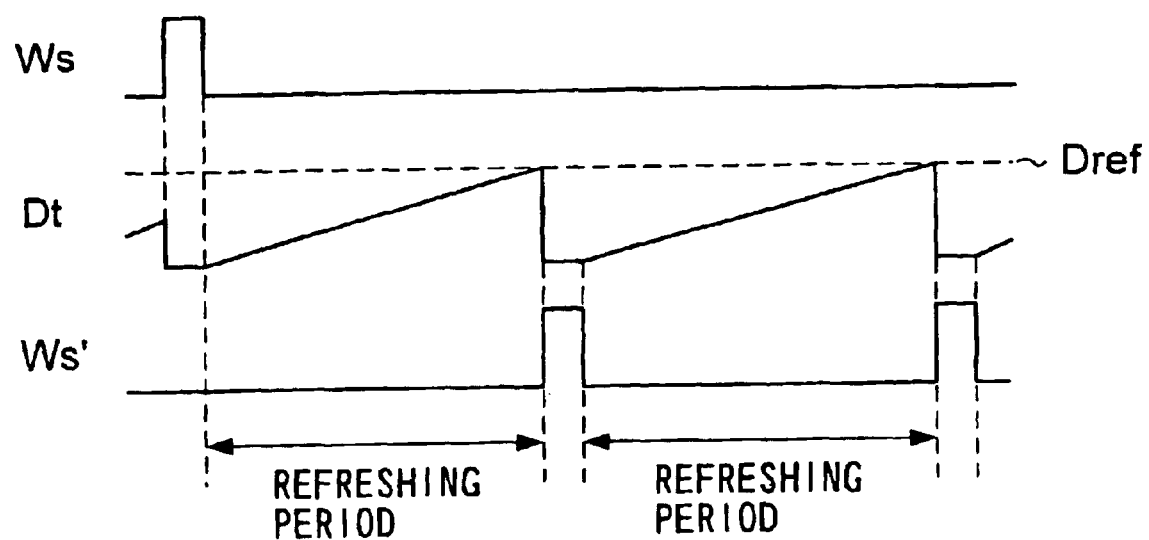
FIG. 38 is a block diagram of the timer apparatus in the writing operation.

FIG. 38 is a timing chart of the timer apparatus 410. As shown, when the writing signal Ws becomes active, the duration data Dt of the timing part 411 is reset and measurement starts. When predetermined refresh period has passed, the duration data Dt and the reference time data Dref coincides, so that the rewriting signal Ws' becomes active. The measurement of refreshing period starts when the writing signal Ws becomes active, or the rewriting signal Ws' is active once the refresh period passes.

By executing the rewriting operation (but the same image) described in the above embodiments, by using the rewriting signal Ws' which is generated to function as a trigger, a displayed image is refreshed.

(I-3) Electronic Devices

Electronic devices attached to the electrophoretic display described above are described as follows:

(1) Electronic books

Figure 39:
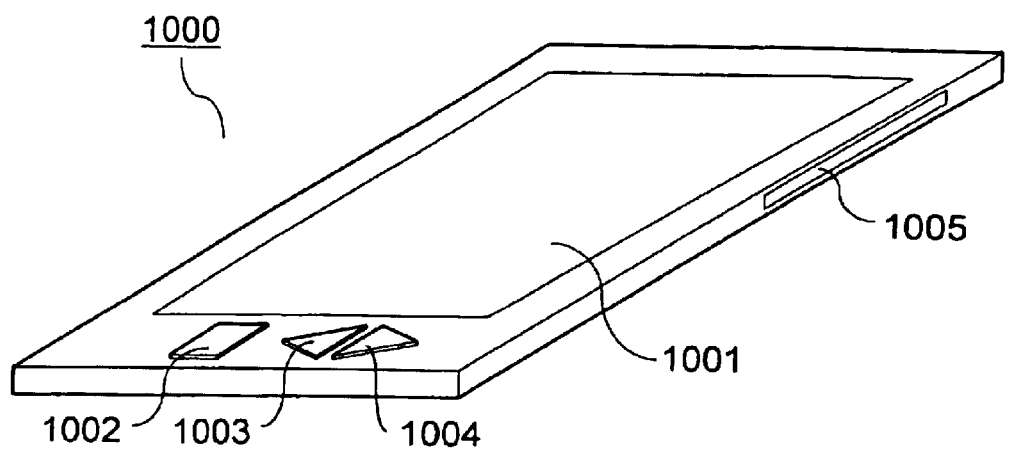
FIG. 39 is an external perspective view of an electronic book as one example of electronic devices.

FIG. 39 is a perspective view showing an electronic book. This electronic book 1000 is provided with an electrophoretic display panel 1001, a power switch 1002, a first button 1003, a second button 1004, and a CD-ROM slot 1005, as shown.

When a user activates the power switch 1002 and then loads a CD-ROM in the CD-ROM drive 1005, contents of the CD-ROM are read out and their menus displayed on the electrophoretic display panel 1001. If the user operates the first and second buttons 1003 and 1004 to select a desired book, the first page of the selected book is displayed on the panel 1001. To scroll down pages, the second button 1004 is pressed, and to scroll up pages, the first button 1003 is pressed.

In this electronic book 1000, if a page of the book is once displayed on the panel screen, the displayed screen will be updated only when the first or second button 1003 or 1004 is pressed. This is because, as stated previously, the pigment particles 3 will migrate only in when an electrostatic field is applied. In other words, to hold the same screen display, it is unnecessary to reapply any voltage. Only during a period for updating displayed images, is it necessary to feed power to the driving circuits to drive the electrophoretic display panel 1001. Thus, in comparison to liquid crystal displays, power consumption is greatly reduced.

Further, images are displayed on the panel 1001 by way of the pigment particles 3 thus preventing any impression of artificial brightness, and providing display characteristics in the electronic book 1000 which are close to those provided or in printed matter. This proximity of display characteristics of the electronic book to printed matter limits eyestrain and makes it possible for the electronic book to be read for extended periods of time.

(2) Personal Computer

Figure 40:
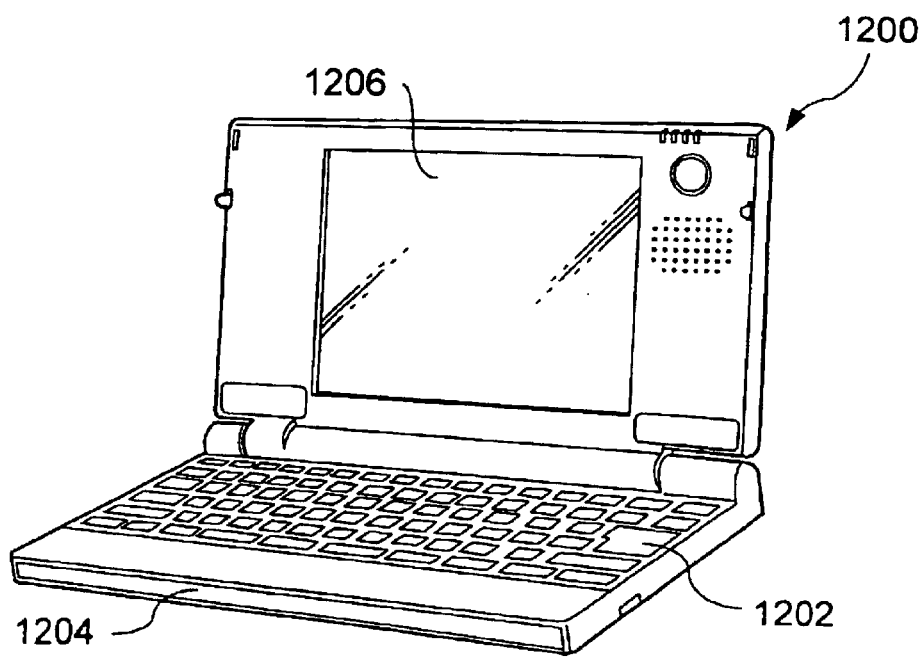
FIG. 40 is an external perspective view of a personal computer as another example of electronic devices.

A portable, note-book typecomputer in which the electrophoretic display is applied will now be exemplified. FIG. 40 is an external perspective view showing such a computer. As shown, the computer 1200 has a main unit 1204 on which a keyboard 1202 is mounted and an electrophoretic display panel 1206. On the panel 1206, images are displayed via pigment particles 3. Hence, it is unnecessary to mount a back light, which is required in transmission type and semi-transmission type of liquid crystal displays, thereby imparting to the computer 1200 a lower weight and smaller size, in addition to greatly decreased power consumption.

(3) Mobile Phone

Figure 41:
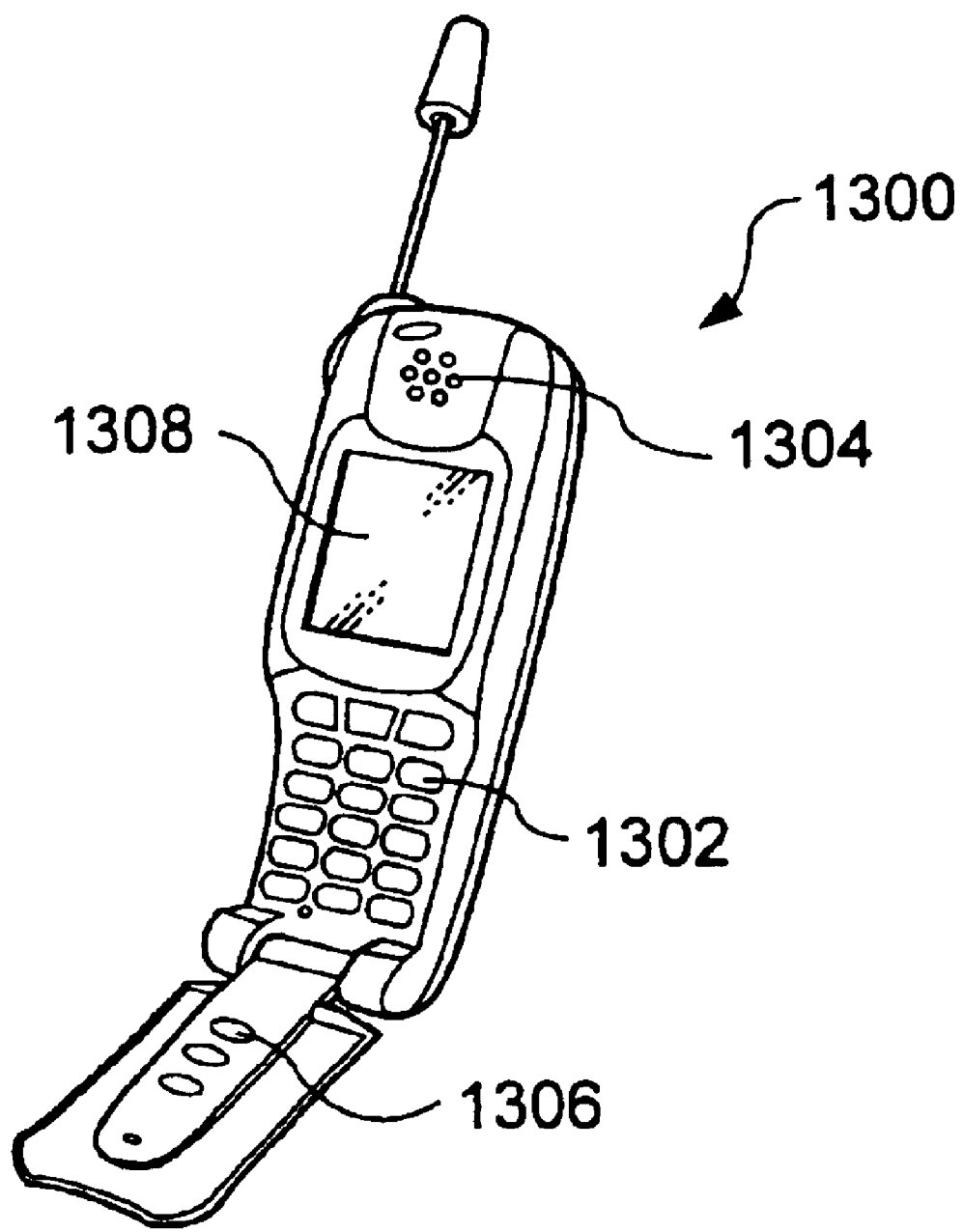
FIG. 41 is an external perspective of a mobile phone as another example of electronic devices.

A mobile phone into which is incorporated the electrophoretic display panel will now be exemplified. FIG. 41 is a an external perspective view of a portable phone. As shown, a portable phone 1300 is provided with a plurality of operation buttons 1302, an ear piece 1304, a mouth piece 1306, and an electrophoretic display panel 1308.

In liquid crystal displays, a polarizing plate is a requisite component for enabling a display screen to be darkened. In the electrophoretic display panel 1308, however, a polarizing plate is not required. Hence the portable phone 1300 is equipped with a bright and readily viewable screen.

Electronic devices other than those shown in FIGS. 39 to 41 include a TV monitor, outdoor advertising board, traffic sign, view-finder type or monitor-direct-viewing type display of a vidoe tape recorder, car navigation device, pager, electronic note pad, electronic calculator, word processor, work station, TV telephone, POS terminal, devices having a touch panel, and others. Thus, the electrophoretic display panel according to each of the foregoing embodiments can be applied for use with such devices. Alternatively, an electro-optical apparatuses having such electrophoretic display panel can also be applied to such devices.

What is claimed is:

1. A method for driving an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrode;

a plurality of dispersal systems including a fluid in which pigment particles are suspended, with each of said dispersal systems being provided between said common electrode and one of said pixel electrodes; and a plurality of switching elements, with one of each of said switching elements being provided at a corresponding one of each of said intersections of said data lines and said scanning lines, with an on/off control terminal being connected to one of said scanning lines passing through one of said intersections; and with one of said data lines passing through one of said intersections, being connected to one of said pixel electrodes provided at each of one said intersections; and the method comprising:

controlling an image displayed by employing said scanning lines and said data lines, each of said voltages being applied within a set period of a single scanning field, in which all of said scanning lines are once scanned; and within said period of a single scanning field, applying a common voltage to a said pixel electrode;

selecting a scanning line sequentially;

applying a voltage to a selected scanning line, to turn on all switching elements connected to said selected scanning lines;

applying a plurality of pixel voltages to a plurality of said data lines for a set time, to generate electrostatic fields to cause said pigment particles to migrate to positions corresponding to desired gradations of an image displayed; and after applying said pixel voltages to said data lines, applying a plurality of brake voltages to said data lines for a set time, to create electrostatic fields in each of said dispersal systems, each of said brake voltages determined based on fluid resistance of said pigment particles and a respective one of said desired gradations;

applying a voltage to said sequentially selected scanning lines, to turn off all of said switching elements connected to said sequentially selected scanning line.

2. The method of claim 1, wherein resetting operation is performed during a period of said scanning field and writing operation is performed during a period of a different scanning field, said resetting and writing operations performed alternately, and the method further comprising the steps of:

in said period for said resetting operation, applying a reset voltage to said plurality of data lines, to create an electrostatic field in each of said dispersal systems, to initialize said pigment particles; and in said period for said rewriting operation, applying to said selected data lines a plurality of voltages corresponding to said desired gradations.

3. The method of claim 2, wherein when a displayed image is switched, said pixel voltage and said reset voltage are applied to only those pixel electrodes corresponding to pixels, the gradation of which pixels change following switching of an image displayed.

4. The method of claim 3, wherein:

a plurality of said scanning lines are selected simultaneously; and said reset voltage is applied to a plurality of said data lines, so that said reset voltage is applied simultaneously to said plurality of pixel electrodes to initialize said pigment particles.

5. The method of claim 1, wherein:

resetting operation is performed during a period of a scanning field and writing operation is performed during a period of next and different scanning field, in said period for said resetting operation, applying said reset voltage is applied to said plurality of pixel electrodes, to initialize said pigment particles; and in said period for said writing operation, a plurality of differential voltages are applied to said data lines, each of which differential voltages corresponds to a difference between a voltage corresponding to a gradation displayed in a previous writing operation, and a gradation to be displayed.

6. The method of claim 1, wherein:

the electrophoretic display includes a table for storing brake voltage data representing values of said brake voltages; and said brake voltage data is retrieved from said table based on image data used for switching a displayed image.

7. The method of claim 1, wherein:

the display further comprises a timer apparatus; and a displayed image is refreshed at a predetermined period of time.

8. A drive circuit for driving an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrode;

a plurality of dispersal systems including a fluid in which pigment particles are suspended, with each of said dispersal systems being provided between said common electrode and one of said pixel electrodes; and a plurality of switching elements, with one of each of said switching elements being provided at a corresponding one of each of said intersections of said data lines and said scanning lines, with an on/off control terminal being connected to one of said scanning lines passing through one of said intersections; and with one of said data lines passing through one of said intersections, being connected to one of said pixel electrodes provided at each of one said intersections;

the drive circuit comprising:

an applying unit for applying said common voltage to said common electrode;

a scanning drive unit for selecting a scanning line sequentially, applying a voltage to a selected scanning line, so as to turn on all of said switching elements which are connected to said sequentially selected scanning line during a certain period of time, and applying a voltage to said selected scanning line, so as to turn off all of said switching elements; and a data line drive unit for applying said common voltage to data lines, applying a plurality of pixel voltages to said data lines during a certain period of time, to migrate said pigment particles to positions corresponding to desired gradations, applying a plurality of brake voltages for braking said pigment particles to said data lines, each of said plurality brake voltages determined based on fluid resistance of said pigment particles and respective one of said desired gradations, and after said application of said brake voltages applying said common voltage to said data lines, said applications of said gradation voltages and brake voltages performed during a period in which a single scanning line is selected for applying a voltage to turn on all of said switching elements.

9. The drive circuit of claim 8, wherein:

resetting operation is performed during a period of a scanning field and writing operation is performed during a period of a different scanning field, said resetting and writing operations performed alternately;

in said period for said resetting operation, said drive circuit applies a reset voltage to said plurality of data lines, to create an electrostatic field in each of said dispersal systems, to initialize said pigment particles; and in said period for said rewriting operation, said drive circuit applies to said selected data lines a plurality of voltages corresponding to said desired gradations.

10. The drive circuit of claim 8, wherein:

resetting operation is performed during a period of a scanning field and writing operation is performed during a period of next and different scanning field, in said period for said resetting operation, said drive circuit applies said reset voltage to said plurality of pixel electrodes, to initialize said pigment particles; and in said period for said writing operation, said drive circuit applies a plurality of differential voltages to said data lines, each of which differential voltages corresponds to a difference between a voltage corresponding to a gradation displayed in a previous writing operation, and a gradation to be displayed.

11. The method of claim 8, wherein:

a table for storing brake voltage data representing values of said brake voltages is provided with the display; and said brake voltage data is retrieved from said table based on image data used for switching a displayed image.

12. The method of claim 8, wherein:

the display further comprises a timer apparatus; and a displayed image is refreshed at a predetermined period of time.

13. An electrophoretic display, comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrode;

a plurality of dispersal systems including a fluid in which pigment particles are suspended, with each of said dispersal systems being provided between said common electrode and one of said pixel electrodes; and a display panel that includes a plurality of switching elements, with one of each of said switching elements being provided at a corresponding one of each of said intersections of said data lines and said scanning lines, with an on/off control terminal being connected to one of said scanning lines passing through one of said intersections;

with one of said data lines passing through one of said intersections, being connected to one of said pixel electrodes provided at each of one said intersections;

an applying unit for applying said common voltage to said common electrode;

a scanning drive unit for selecting a scanning line sequentially, applying a voltage to a selected scanning line, so as to turn on all of said switching elements which are connected to said sequentially selected scanning line during a certain period of time, and applying a voltage to said selected scanning line, so as to turn off all of said switching elements; and a data line drive unit for applying said common voltage to data lines, applying a plurality of pixel voltages to said data lines during a certain period of time, to migrate said pigment particles to positions corresponding to desired gradations, applying a plurality of brake voltages for braking said pigment particles to said data lines, each of said brake voltages determined based on fluid resistance of said pigment particles and respective one of said desired gradations, and after said application of said brake voltages applying said common voltage to said data lines, said applications of said gradation voltages and brake voltages performed during a period in which a single scanning line is selected for applying a voltage to turn on all of said switching elements.

14. The electrophoretic display of claim 13, wherein said pigment particles reflect a certain color being displayed in said pixels and said fluid absorbs said color.

15. The electrophoretic display of claim 13, each of said plurality of said dispersal systems includes three subsets of dispersal systems, in each of the subsets red, blue, and green particles being contained, so as to display a colored image.

16. The electrophoretic display of claim 13, wherein said pigment particles are provided with differing properties.

17. An electronic device with which an electrophoretic display provided, the electrophoretic display, comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrode;

a plurality of dispersal systems including a fluid in which pigment particles are suspended, with each of said dispersal systems being provided between said common electrode and one of said pixel electrodes;

a display panel that includes a plurality of switching elements, with one of each of said switching elements being provided at a corresponding one of each of said intersections of said data lines and said scanning lines, with an on/off control terminal being connected to one of said scanning lines passing through one of said intersections;

with one of said data lines passing through one of said intersections, being connected to one of said pixel electrodes provided at each of one said intersections;

an applying unit for applying said common voltage to said common electrode;

a scanning drive unit for selecting a scanning line sequentially, applying a voltage to a selected scanning line, so as to turn on all of said switching elements which are connected to said sequentially selected scanning line during a certain period of time, and applying a voltage to said selected scanning line, so as to turn off all of said switching elements; and a data line drive unit for applying said common voltage to data lines, applying a plurality of pixel voltages to said data lines during a certain period of time, to migrate said pigment particles to positions corresponding to desired gradations, applying a brake voltage for braking said pigment particles to said data lines, said brake voltages determined based on fluid resistance of said pigment particles and said desired gradations, and after said application of said brake voltages applying said common voltage to said data lines, said applications of said gradation voltages and brake voltages performed during a period in which a single scanning line is selected for applying a voltage to turn on all of said switching elements.

* * * * *